United States Patent
Sadasue

(10) Patent No.: US 11,671,574 B2
(45) Date of Patent: *Jun. 6, 2023

(54) INFORMATION PROCESSING APPARATUS, IMAGE CAPTURE APPARATUS, IMAGE PROCESSING SYSTEM, AND METHOD OF PROCESSING A PLURALITY OF CAPTURED IMAGES OF A TRAVELING SURFACE WHERE A MOVEABLE APPARATUS TRAVELS

(71) Applicant: Ricoh Company, Ltd., Tokyo (JP)

(72) Inventor: Tamon Sadasue, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,045

(22) Filed: Dec. 28, 2021

(65) Prior Publication Data

US 2022/0159229 A1     May 19, 2022

Related U.S. Application Data

(63) Continuation of application No. 16/968,986, filed as application No. PCT/JP2019/011277 on Mar. 18, 2019, now Pat. No. 11,245,888.

(30) Foreign Application Priority Data

Mar. 19, 2018  (JP) .................................. 2018-051843
Mar. 15, 2019  (JP) .................................. 2019-047938

(51) Int. Cl.
*H04N 13/128*     (2018.01)
*G06T 7/593*      (2017.01)
(Continued)

(52) U.S. Cl.
CPC .......... *H04N 13/128* (2018.05); *E01C 23/01* (2013.01); *G01C 7/04* (2013.01); *G06T 7/593* (2017.01);
(Continued)

(58) Field of Classification Search
None
See application file for complete search history.

(56) References Cited

U.S. PATENT DOCUMENTS 7,697,727 B2   4/2010   Xu et al.
7,801,333 B2   9/2010   Laurent et al.
(Continued)

FOREIGN PATENT DOCUMENTS

JP   7-318342 A      12/1995
JP   H09-287933 A    11/1997
(Continued)

OTHER PUBLICATIONS

International Search Report and Written Opinion dated Aug. 1, 2019 in PCT/JP2019/011277 filed on Mar. 18, 2019.
(Continued)

*Primary Examiner* — Stefan Gadomski
(74) *Attorney, Agent, or Firm* — Xsensus LLP

(57) ABSTRACT

An information processing apparatus includes an acquisition unit configured to acquire a plurality of captured images of a traveling surface where a movable apparatus travels, each of the captured images including distance information in a depth direction transverse to the traveling surface, the plurality of captured images having been captured using a plurality of stereo image capture devices, and an image processing unit configured to stitch together the plurality of images of the traveling surface captured by the plurality of stereo image capture devices by identifying partially overlapping portions of one or more pairs of the images captured (Continued)

by respective stereo image capture devices which are adjacent in a width direction of the traveling surface.

20 Claims, 30 Drawing Sheets

(51) Int. Cl.
| | |
|---|---|
| *H04N 13/296* | (2018.01) |
| *H04N 13/239* | (2018.01) |
| *E01C 23/01* | (2006.01) |
| *G01C 7/04* | (2006.01) |
| *H04N 13/00* | (2018.01) |

(52) U.S. Cl.
CPC ......... *H04N 13/239* (2018.05); *H04N 13/296* (2018.05); *G01B 2210/52* (2013.01); *G06T 2207/30184* (2013.01); *G06T 2207/30252* (2013.01); *G06T 2207/30256* (2013.01); *H04N 2013/0081* (2013.01)

(56) References Cited

U.S. PATENT DOCUMENTS

| | | | |
|---|---|---|---|
| 7,850,395 | B1 | 12/2010 | Brenner et al. |
| 9,049,433 | B1 | 6/2015 | Prince |
| 10,612,994 | B2 | 4/2020 | Prozzi et al. |
| 2002/0101438 | A1 | 8/2002 | Ham et al. |
| 2002/0114509 | A1 | 8/2002 | Takeuchi et al. |
| 2003/0179194 | A1 | 9/2003 | Robert et al. |
| 2004/0105579 | A1 | 6/2004 | Ishii et al. |
| 2004/0160595 | A1 | 8/2004 | Zivkovic et al. |
| 2011/0221906 | A1 | 9/2011 | Xu et al. |
| 2012/0081542 | A1 | 4/2012 | Suk et al. |
| 2012/0249729 | A1 | 10/2012 | Miyamoto et al. |
| 2013/0046471 | A1 | 2/2013 | Rahmes et al. |
| 2013/0051913 | A1 | 2/2013 | Eul |
| 2013/0076871 | A1 | 3/2013 | Reeves |
| 2013/0129194 | A1 | 5/2013 | Gusis et al. |
| 2013/0136539 | A1 | 5/2013 | Aardema |
| 2013/0155061 | A1 | 6/2013 | Jahanshahi et al. |
| 2014/0375770 | A1 | 12/2014 | Habel et al. |
| 2015/0228057 | A1 | 8/2015 | Ishigami et al. |
| 2015/0371094 | A1 | 12/2015 | Gardiner et al. |
| 2016/0232412 | A1 | 8/2016 | Nishijima |
| 2017/0002525 | A1 | 1/2017 | Horn et al. |
| 2017/0151850 | A1 | 6/2017 | Deigmoller et al. |
| 2017/0204569 | A1 | 7/2017 | Shah et al. |
| 2017/0345129 | A1 | 11/2017 | Doshi et al. |
| 2017/0350698 | A1 | 12/2017 | Shah et al. |
| 2018/0027224 | A1 | 1/2018 | Javidnia et al. |
| 2018/0052457 | A1 | 2/2018 | Kim et al. |
| 2018/0225526 | A1 | 8/2018 | Nanri et al. |
| 2018/0278854 | A1 | 9/2018 | Kottel et al. |
| 2019/0196487 | A1 | 6/2019 | Akiyama et al. |
| 2020/0031281 | A1 | 1/2020 | Watanabe et al. |
| 2020/0031283 | A1 | 1/2020 | Nakasho et al. |

FOREIGN PATENT DOCUMENTS

| | | |
|---|---|---|
| JP | 2016-105100 A | 6/2016 |
| JP | 2017-072560 A | 4/2017 |
| JP | 2017-142613 A | 8/2017 |

OTHER PUBLICATIONS

Office Action dated Nov. 29, 2022 in Japanese Patent Application No. 2019-047938, 8 pages.

Tomoaki Inami, et al., "Pothole Detection Algorithm using In-Vehicle Stereo Camera", The Institute of Electronics, Information and Communication Engineers, 2014, 6 pages, (with English Abstract).

INFORMATION PROCESSING APPARATUS, IMAGE CAPTURE APPARATUS, IMAGE PROCESSING SYSTEM, AND METHOD OF PROCESSING A PLURALITY OF CAPTURED IMAGES OF A TRAVELING SURFACE WHERE A MOVEABLE APPARATUS TRAVELS

CROSS-REFERENCE TO RELATED APPLICATIONS

This application is a continuation of U.S. application Ser. No. 16/968,986, filed Aug. 11, 2020, which is based on PCT filing PCT/JP2019/011277, filed Mar. 18, 2019, and claims priority to Japanese Application No. 2019-047938, filed Mar. 15, 2019, and Japanese Application No. 2018-051843, filed Mar. 19, 2018, the entire contents of each are incorporated herein by reference.

TECHNICAL FIELD

This disclosure relates to an information processing apparatus, an image capture apparatus, an image processing system, and a method of processing information.

BACKGROUND ART

Properties of paved surface (e.g., a traveling surface on which passenger vehicles travel) are required to be inspected periodically because damage occurs to the paved surface due to running vehicles and weather conditions. Conventionally, various methods have been proposed for inspecting the road properties. Some government agencies define, for example, three types of indexes such as the number of cracks, rutting depth, and flatness as the inspection items of the road properties. As to these indexes, the crack is inspected visually or analyzed based on images captured by a camera while the rutting depth is measured using a light section method that uses a camera and a line scan laser. Further, the flatness is typically measured using a tool known as a profile meter having a total length of 3 meters including a 1.5-m front section and a 1.5-m rear section.

However, since the profile meter is moved manually by a user, preparation of the measurement is troublesome, and it is difficult to measure and move quickly. Patent Document 1 (JP-H07-318342-A) discloses a technology using a special vehicle having a length of 3 meters or more in a traveling direction and including an apparatus for measuring the flatness. As described in Patent Document 1, a device for irradiating a laser beam downward is disposed at each of the front, middle and rear portions of the special vehicle to measure the distance from the device to the ground at the same time at three points, with which the flatness can be efficiently measured.

CITATION LIST

Patent Literature

[PTL 1]
Japanese Patent Application Laid-Open No. H07-318342

SUMMARY

Technical Problem

However, conventional technologies for inspecting the road properties need special tools to measure each one of the road properties, such as three special tools for respectively measuring and analyzing the three types of indexes such as flatness, rutting depth, and crack. Therefore, conventional technologies for inspecting the road properties need the special vehicle having 3 meters or more length in the traveling direction disclosed in JP-H07-318342-A, a laser irradiation apparatus and a measurement apparatus used for the light section method, and a lighting apparatus for capturing images, resulting into an expensive system.

The present invention is devised in view of the above issue, and aims to provide a new and useful surface inspection system. It is an object of some embodiments of the present invention to enable the measurement of any one of three types of index used for inspecting a traveling surface, or any combination of two or three of the three types, using a simpler configuration than in conventional systems.

Solution to Problem

There is provided an information processing apparatus including an acquisition unit configured to acquire a plurality of captured images of a traveling surface where a movable apparatus travels, each of the captured images including distance information in a depth direction of the traveling surface (i.e. transverse to the travelling surface), the plurality of captured images having been captured using a plurality of stereo image capture devices, and an image processing unit configured to stitch together the plurality of images of the traveling surface captured by the plurality of stereo image capture devices by identifying partially overlapping portions of one or more pairs of the images (i.e. images which are of adjacent portions of the surface) captured by respective stereo image capture devices which are adjacent in a width direction of the traveling surface (e.g. in a direction transverse to a direction in which the vehicle travels). That is, each of the stereo image capture devices has a field of view which is relatively offset from the field of view of the other stereo image capture devices in the width direction (and possibly also slightly offset in the direction in which the movable vehicle travels), and the identification identifies partially overlapping portions of pairs of the images captured by respective ones of the stereo image cameras for which the respective fields of view are neighbors in the width direction. Optionally, the image processing unit may also stitch together images captured by the stereo image capture devices at different times while the vehicle is travelling. Thus, for each stereo camera, a set of stereo images captured at different respective times may be stitched together.

Advantageous Effects of Invention

According to preferred embodiments of the present invention, any one of three types of index used for inspecting a traveling surface can be measured, or any combination of two or three of the three types of index used for inspecting the traveling surface can be measured, using a simpler configuration.

DESCRIPTION OF EMBODIMENTS

Figure 1:
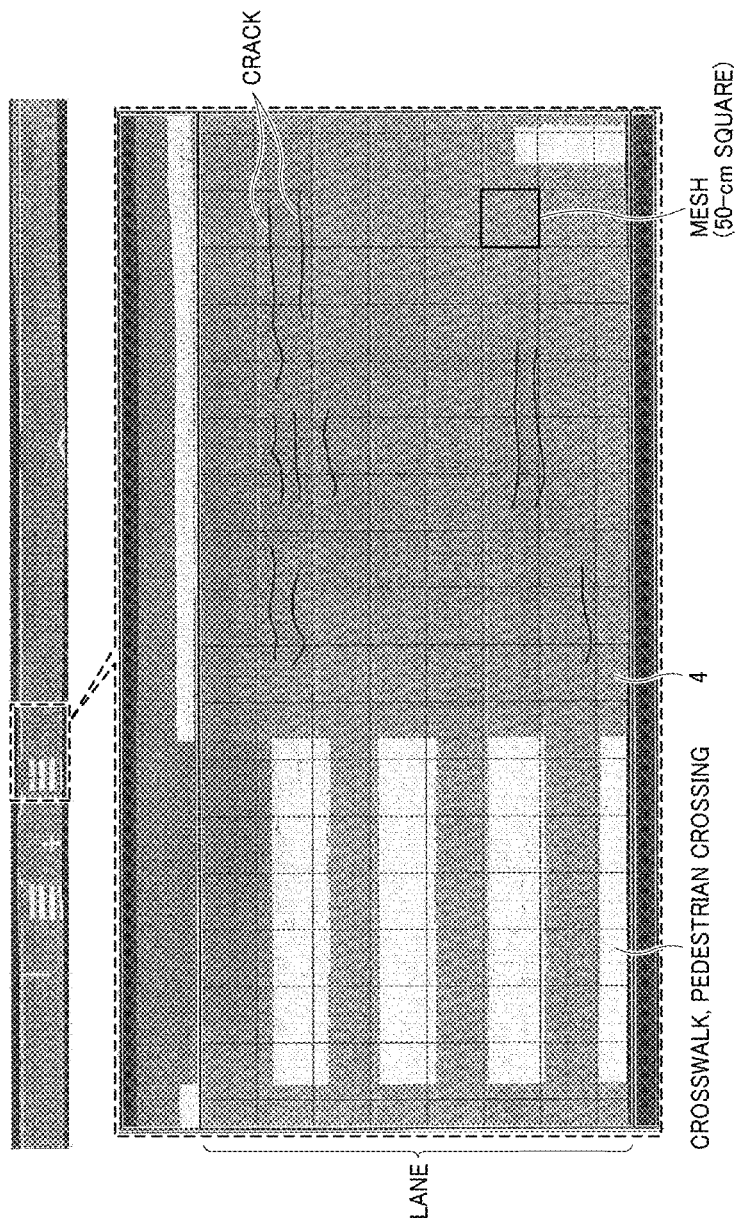
FIG. 1 illustrates an example of an image used for determining cracks using a mesh.

The terminology used herein is for the purpose of describing particular embodiments only and is not intended to be limiting of the present invention. As used herein, the singular forms "a", "an" and "the" are intended to include the plural forms as well, unless the context clearly indicates otherwise. In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. Hereinafter, a description is given of an information processing apparatus, an image capture apparatus, a movable apparatus, an image processing system, and a method of processing information according to one or more embodiments of the present invention with reference to the accompanying drawings.

(Conventional Inspection Method of Road Properties)

Hereinafter, a description is given of a conventional method of inspecting road properties before describing one or more embodiments. As to the inspection method of road properties, national, regional or local government agencies have prepared the standards for road inspection including the maintenance control index (MCI) for paved surfaces as an indicator for evaluating the road properties (e.g., properties of a traveling surface, intended for vehicles to travel on). The MCI is used for quantitatively evaluating the paved surface serviceability based on, for example, three types of road surface properties, such as "crack ratio, rutting, and flatness." In this description, the traveling surface is also referred to as an inspection surface or a target surface for inspection since the road surface (traveling surface) is a target of inspection. In this description, the paved surface may mean, for example, paved roads or pavement roads on which passenger vehicles travel.

FIG. 1 illustrates an example of an image of a road surface used for determining and measuring the crack ratio on the road surface. FIG. 1 illustrates an example of an image of a road surface 4 (i.e., traveling surface) that is captured near a crosswalk (pedestrian crossing) and divided into a plurality of meshes each having 50-cm square. As indicated in FIG. 1, cracks have occurred on the road surface near the crosswalk.

Among the three types of road surface properties such as "crack ratio, rutting, and flatness," the crack ratio is calculated using the following formula [Math. 1], in which the crack area is calculated from the number of cracks and the patching area detected in each segment set on the road surface, which is divided into the 50-cm square meshes, and then the crack ratio is calculated by applying a calculation result of the crack area into the formula [Math. 1]. The patching area means a portion of the road surface that is repaired partially, such as filling or stacking a pot hole or pit hole, which is a portion recessed from the road surface due to peeling and recessing the road surface, and/or a cracked portion that has occurred on the road surface, using repair materials, such as asphalt mixture, and a method of repairing the pot hole is referred to as the patching.

The crack area can be calculated as below based on the inspection standard defined by the government agencies.

segment has one crack: crack area is 0.15 $m^2$
segment has two cracks: crack area is 0.25 $m^2$
segment has patching area of 0 to 25%: crack area is 0 $m^2$
segment has patching area of 25 to 75%: crack area is 0.125 $m^2$ segment has patching area of 75% or more: crack area is 0.25 m²

$$\text{CRACK RATIO}(\%) = \frac{\text{AREA OF CRACK(m}^2)}{\text{AREA OF EVALUATION SECTION(m}^2)} \times 100 \quad [\text{Math. 1}]$$

Figure 2A:
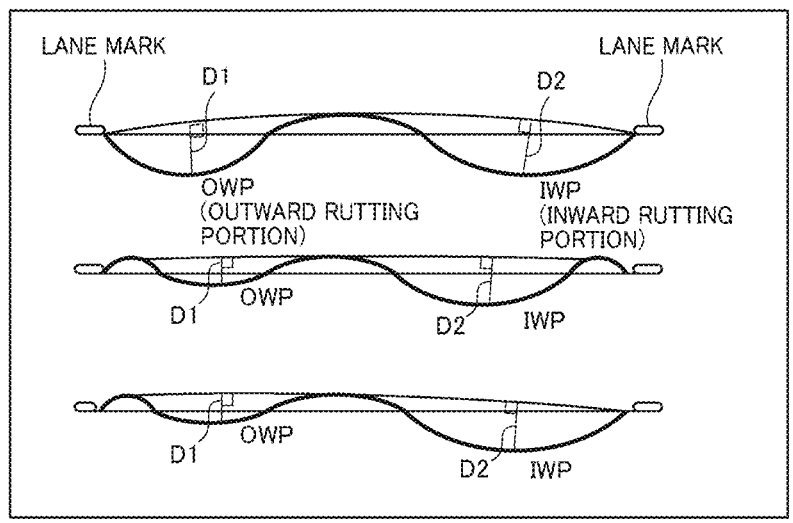
FIGS. 2A and 2B illustrate a scheme of measuring rutting depth.
Figure 2B:
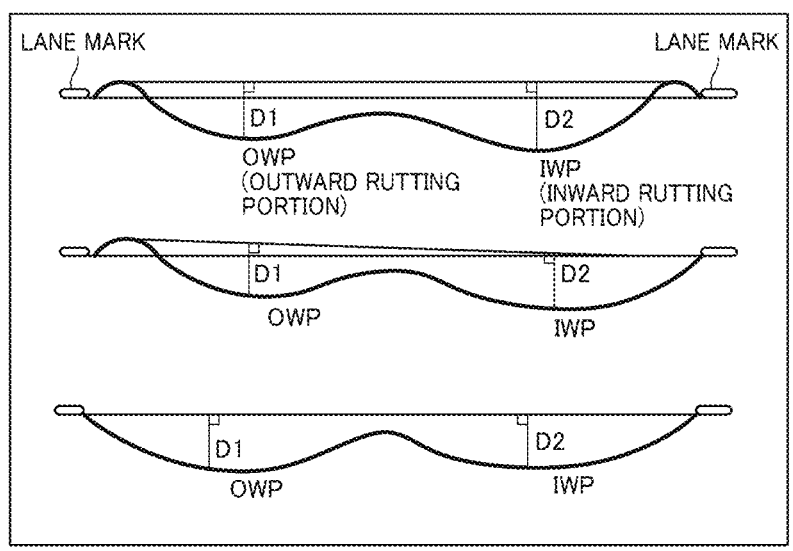

In an example case illustrated in FIGS. 2A and 2B, two rutting portions having a rutting depth D1 and a rutting depth D2 occurring in one lane are measured, and then any one of the measured rutting depth D1 and rutting depth D2, which has a larger value, is adopted as the measured rutting depth. Since the rutting occurs in several patterns, the measurement method of rutting depth is specified for each pattern. FIG. 2A illustrates one example case of a measurement method when a portion between two rutting portions is higher than the side ends of the road, and FIG. 2B illustrates another example case of a measurement method when a portion between two rutting portions is lower than the side ends of the road.

Figure 3:
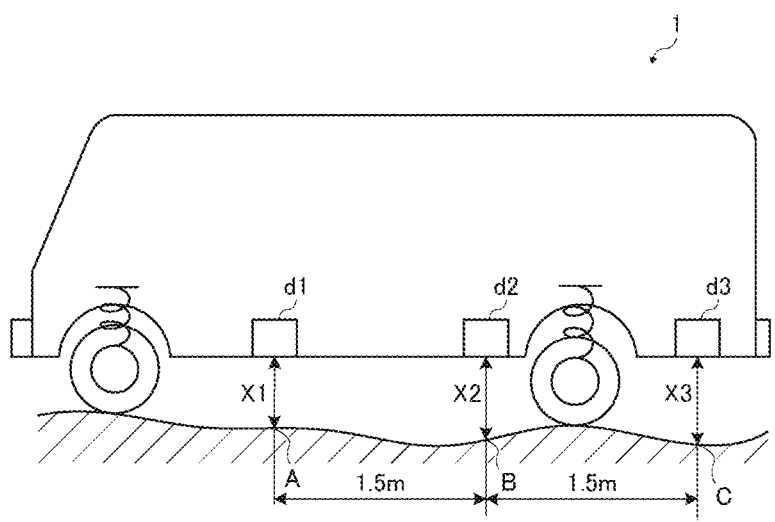
FIG. 3 illustrates an example of a scheme of measuring flatness.

The "flatness" is measured along the traveling direction of the vehicle on the road surface by measuring the height from the reference plane at three points set with a 1.5-m interval. For example, as illustrated in FIG. 3, measurement devices d1, d2, and d3 are disposed at the lower face of a vehicle 1 spaced apart by a 1.5-m interval to respectively measure the height X1, X2, and X3 at three points A, B, and C. Then, the deviation amount "d" is determined by applying the following formula [Math. 2] using the measured height of X1, X2, and X3. This measurement is performed multiple times by moving the vehicle on the road surface. Then, the formula [Math. 3] is calculated using a plurality of deviation amounts "d," obtained by performing the above described measurement, to calculate the flatness "σ."

$$d = \frac{X1 + X3}{2} - X2 \quad [\text{Math. 2}]$$

$$\sigma = \sqrt{\frac{\sum d^2 - \frac{(\sum d)^2}{n}}{n-1}} \quad [\text{Math. 3}]$$

The measurement of the above described "crack ratio, rutting depth and flatness" is performed for each evaluation section having a length of 100 meters. If damaged portions are already known, the measurement can be performed by dividing the 100-m evaluation section into a smaller evaluation section, such as a 40-m evaluation section and a 60-m evaluation section. The MCI is calculated from the measurement result obtained for each 100-m evaluation section, and an inspection report is created based on the calculated MCI.

Based on the measured crack ratio "C" (%), rutting depth "D" (mm), and flatness "σ" (mm), four formulas in Table 1 are calculated to calculate values of MCI, MCI1, MCI2 and MCI3, respectively. Then, the minimum value among the calculated MCI, MCI1, MCI 2, and MCI 3 is adopted as the MCI. Based on the adopted MCI, the evaluation is performed in accordance with evaluation criteria indicated in Table 2 to determine whether or not repair is necessary for the evaluation section set on the road surface.

TABLE 1

| | Formulas |
|---|---|
| Formula 1 | MCI = 10 − 1.48$C^{0.3}$ − 0.29$D^{0.7}$ − 0.47$\sigma^{0.2}$ |
| Formula 2 | MCI1 = 10 − 1.5$C^{0.3}$ − 0.3$D^{0.7}$ |
| Formula 3 | MCI2 = 10 − 2.23$C^{0.3}$ |
| Formula 4 | MCI3 = 10 − 0.54$D^{0.7}$ |

TABLE 2

| MCI | Necessity of Paved Surface Repair |
|---|---|
| 4 < MCI ≤ 5 | Repair is preferable |
| 3 < MCI ≤ 4 | Repair is required |
| MCI ≤ 3 | Immediate Repair is required |

First Embodiment

Hereinafter, a description is given of an image processing system according to a first embodiment. In the first embodiment, a camera, such as a stereo camera, which can capture stereo images is mounted on a vehicle to capture the stereo images of the road surface. Hereinafter, the stereo image may mean one or more stereo images. Based on the captured stereo image, depth information (depth distance) corresponding to a distance value to a road surface at each image capture position is acquired to generate three-dimensional road surface shape and create three-dimensional road surface data. Then, the crack ratio, rutting depth, and flatness to be used for calculating the MCI can be acquired by analyzing the generated three-dimensional road surface data. The stereo camera may be also referred to as an image capture unit and a measurement apparatus.

The analysis of the three-dimensional road surface data is described in detail. The stereo camera includes two cameras spaced apart from each other by a given length (referred to as a baseline length), and outputs a pair of images, each captured by the respective camera, as a stereo image. By searching corresponding points between the two images configuring the stereo image, the depth distance at any specific point in the captured image can be calculated. By calculating the depth distance for the entire area of the captured image, data representing each pixel using the depth information can be generated as a depth map. That is, the depth map is three-dimensional point group information defined by one or more groups of points respectively having three-dimensional information.

In this description, the depth distance indicates the height (distance) from the stereo camera to the road surface (traveling surface). More specifically, the depth distance corresponds to the height (distance) from an imaging plane (image capture element face) of the stereo camera to the road surface. Further, instead of using the imaging plane of the stereo camera for defining the depth distance to the road surface, another part of the stereo camera can be used to define the depth distance to the road surface based on a given calculation method.

Figure 4A:
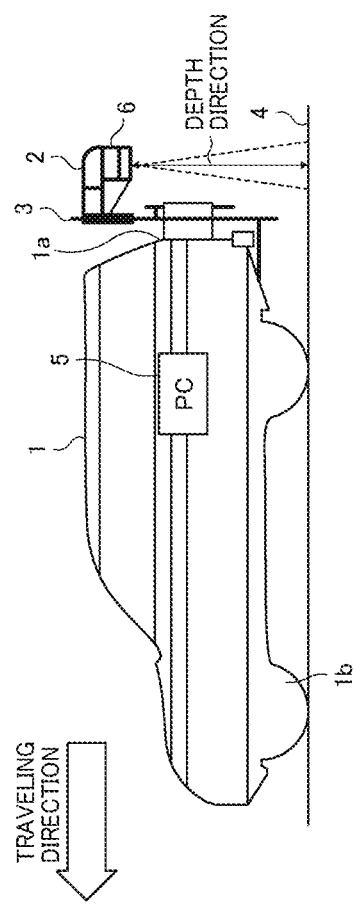
FIGS. 4A and 4B illustrate an example of a configuration of an image processing system according to a first embodiment.
Figure 4B:
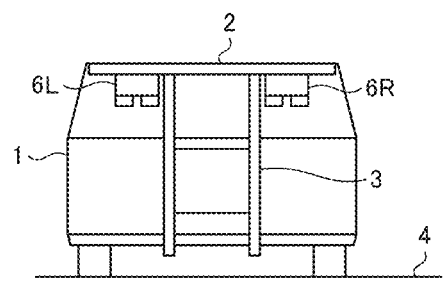

Further, an example of a depth direction is indicated in FIGS. 4A and 4B. Typically, the depth direction corresponds to a vertical direction with respect to the traveling surface (i.e., a direction perpendicular to the horizontal plane), but the depth direction may not always mean the vertical direction. For example, the depth direction can be defined as the depth direction of the stereo image captured for the traveling surface, that is, the direction along the optical axis of the stereo camera. Further, the depth direction includes at least a direction in which the rutting depth can be measured. Specifically, the depth direction includes a direction in which the rutting depths D1 and D2 illustrated in FIGS. 2A and 2B can be measured. Further, the distance information in the depth direction corresponds to the height information from the stereo camera to the road surface (traveling surface), which is measured in at least in the direction that can measure the rutting depth along the optical axis of the stereo camera.

The stereo camera can be mounted on one portion of the vehicle, such as a rear end of the vehicle, by setting an image capture direction of the stereo camera to a downward direction to capture images of the road surface where the vehicle travels. In this description, it is assumed that an image capture range of the stereo camera, mounted on the vehicle for measuring the road surface properties, can cover a given length in the road width direction that is defined by the road inspection regulation.

When the depth map is generated from the stereo images captured by the stereo cameras, the depth map is divided into a plurality of rectangular-shaped segments along a direction perpendicular to the traveling direction (i.e., each rectangular-shaped segment extending along the road width direction), and then the values of depth distance in each rectangular-shaped segment are arranged along the road width direction to obtain the rutting depth D along the road width direction. The rutting depth D1 and the rutting depth D2 can be calculated based on a change of the depth distance in the road width direction.

The crack ratio "C" can be obtained by analyzing the captured images of the road surface, detecting the crack, and then performing the calculation using the above described formula [Math. 1] based on the detection result of crack.

In the above described configuration, since the image capture range of a one-time image capture operation (i.e. an operation in which each of the stereo cameras capture one respective image) in the traveling direction of the vehicle is limited to a given length smaller than a given evaluation section (e.g., a 100-meter evaluation section), the crack ratio "C" in the given evaluation section cannot be calculated based on the image captured by the one-time image capture operation alone. Therefore, while moving the vehicle along the road surface, images are captured by sequentially sifting the image capture range in accordance with the movement of the vehicle corresponding to the movement length in the traveling direction of the vehicle. When capturing the images from the moving vehicle, a trigger instructing the image capture operation (image capture trigger) is controlled so that the image capture range in the previous image capture operation and the image capture range in the current image capture operation can overlap with a given overlapping ratio set in advance.

In this way, by controlling the image capture trigger in accordance with the movement state of the vehicle, images of the road surface to be measured can be captured without missing a portion of the road surface. Then, the images captured sequentially in accordance with the movement or traveling of the vehicle are stitched together using an image processing technique known as "stitching" to generate, for example, one integrated image for each 100-m evaluation section of the road surface. By checking and/or analyzing the one integrated image of each 100-m evaluation section of the road surface visually by an inspector or an information processing apparatus, the crack ratio "C" on the road surface can be measured.

The flatness measurement uses a technique, such as Structure from Motion (SfM), in which image capture positions (that is, positions on the travelling surface) are estimated based on images captured at the respective different image capture positions by setting a sufficient level of an overlapping ratio between captured images.

Hereinafter, a description is given of the processing of SfM. At first, images captured by overlapping the image capture ranges are used to detect a point in one captured image and a point in another captured image, which are the same location point, as corresponding points. It is preferable to detect the corresponding points as much as possible. Then, the movement of the camera from the image capture point of the first image to the image capture point of the second image is defined by setting simultaneous equations using coordinates of the detected corresponding points, and then parameters that can set the smallest total error are calculated. In this manner, the image capture position of the second image can be calculated.

As described above, the depth distance at any specific point in the captured image can be generated as the depth map based on the stereo image captured at each image capture position. The depth map is a map that indicates the depth distance between the stereo camera and a measurement target (e.g., road surface 4) in the stereo image at the image capture position as a distance image. When the image capture position of the second image is calculated by solving the simultaneous equations as above described, with respect to the depth map corresponding to the first stereo image, the depth map corresponding to the second stereo image is converted into a depth map setting the image capture position of the camera that captured the second stereo image as the point of origin. As a result, the two depth maps can be integrated into the coordinate system of one depth map. In other words, the two depth maps can be synthesized to generate the one depth map.

By performing the above described processing to all of the stereo images captured for each 100-m evaluation section and synthesizing the depth maps, generated from the stereo images, the road surface of each 100-m evaluation section can be regenerated in one three-dimensional space. By applying the depth distance of the road surface regenerated in this manner to the above described formula [Math. 2], the deviation amount "d" can be calculated. Then, the deviation amount "d" is applied to the above the formula [Math. 3] to calculate the flatness "a." For example, the depth distance corresponds to the height X between the measurement device and the road surface (traveling surface) measured by the measurement device.

In the first embodiment, by performing the image capture operation using the stereo camera mounted on the vehicle and the image processing on the captured stereo image, the flatness "a," the rutting depth "D," and the crack ratio "C" of the road surface used for calculating the MCI can be collectively measured. In the first embodiment, the above described measurement can be performed using the image processing system including the stereo camera and an information processing apparatus used for performing the image processing on the stereo images output from the stereo camera, with which the maintenance control index (MCI) can be obtained using a simpler configuration than conventional technologies.

In conventional technologies, the measurement of the three types of indexes used for calculating the MCI is performed using different apparatuses, respectively, and because of this the control and management related to data saving and time synchronization between data have been complicated. In contrast, in the first embodiment, since the three types of indexes used for calculating the MCI can be measured and/or calculated using the common stereo images, the control and management related to data storage and time synchronization between data can be performed easily.

(Arrangement of Camera in First Embodiment)

Hereinafter, a description is given of an example of an arrangement of the camera according to the first embodiment. FIGS. 4A and 4B illustrate an example of a configuration of the image processing system according to the first embodiment. FIG. 4A illustrates a side view of the vehicle 1, which is used for the image processing system according to the first embodiment. In FIG. 4A, the direction toward the left side indicates a traveling direction of the vehicle 1. That is, in FIG. 4A, the left end of the vehicle 1 is a front end of the vehicle 1 and the right end of the vehicle 1 is a rear end of the vehicle 1. FIG. 4B illustrates an example of a rear view of the vehicle 1 viewed from the rear side.

The image processing system according to the first embodiment includes, at least, a plurality of stereo image capture devices, such as two stereo cameras 6, and an information processing apparatus, such as a personal computer (PC) 5. The image processing system can further include the vehicle 1 used as a movable apparatus (or equivalently "movable machine"). The vehicle 1 includes, for example, the stereo cameras 6, a housing 1a such as a body, a movement drive unit 1b including an engine, tires, or the like to enable to move the vehicle 1 along the road surface (traveling surface), and a fixing unit 2 capable of fixing the stereo camera 6 on the housing 1a to enable the stereo camera 6 to capture the image of the road surface (traveling surface). The image processing system can further include a mounting member 3 having the fixing unit 2 capable of fixing the stereo camera 6 on the rear end of the vehicle 1 (e.g., housing 1a). The mounting member 3 attaches one or more stereo cameras 6 to the fixing unit 2. In this configuration, as illustrated in FIG. 4B, it is assumed that two stereo cameras 6L and 6R (functioning as the plurality of stereo image capture devices) are fixed to the fixing unit 2 respectively at each end side in the width direction of the vehicle 1. Each of the stereo cameras 6L and 6R is mounted by setting an image capture direction of the stereo cameras 6L and 6R toward the road surface 4 which the vehicle 1 moves or travels on, to capture the image of the road surface 4. For example, each of the stereo cameras 6L and 6R is mounted on the vehicle 1 to capture the image of the road surface 4 from the vertical direction with respect to the road surface 4.

Hereinafter, when there is no need to distinguish the stereo cameras 6L and 6R, the stereo cameras 6L and 6R are collectively referred to as the stereo camera 6.

The stereo camera 6 can be controlled by, for example, the PC 5, which is disposed, for example, inside the vehicle 1. An operator operates the PC 5 to instruct a start of the image capture operation using the stereo camera 6. When the start of the image capture operation is instructed, the PC 5 activates the image capture operation using the stereo camera 6. The image capture operation is performed by controlling the image capture timing in accordance with the movement velocity of the stereo camera 6 (i.e., vehicle 1), and performed repeatedly.

For example, in response to the completion of image capture operations for the inspection-required evaluation section, the operator operates the PC 5 to instruct a deactivation of the image capture operation. The PC 5 deactivates the image capture operation using the stereo camera 6 in accordance with the operator instruction to end the image capture operation.

Figure 5:
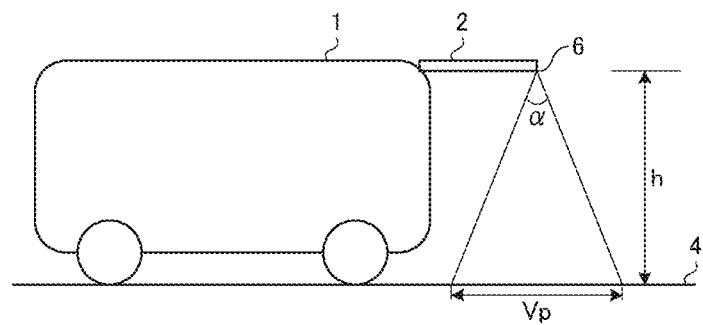
FIG. 5 illustrates an image capture range set for a stereo camera in a traveling direction of a vehicle according to the first embodiment.
Figure 6A:
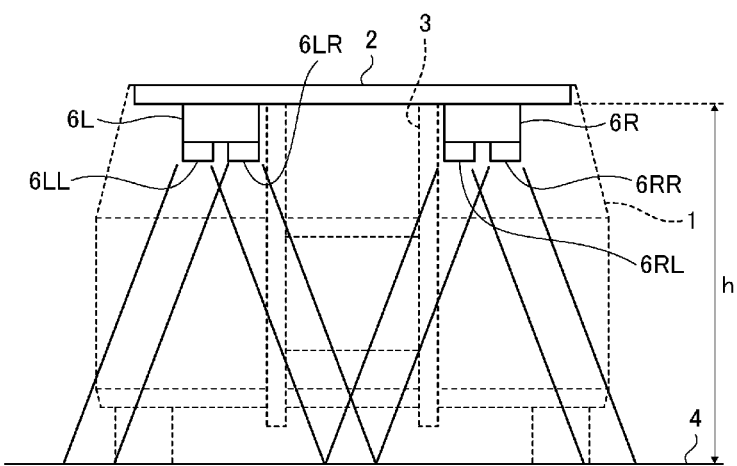
FIGS. 6A and 6B illustrate an example of image capture ranges in a road width direction covered by a plurality of stereo cameras (e.g., two stereo cameras) according to the first embodiment.
Figure 6B:
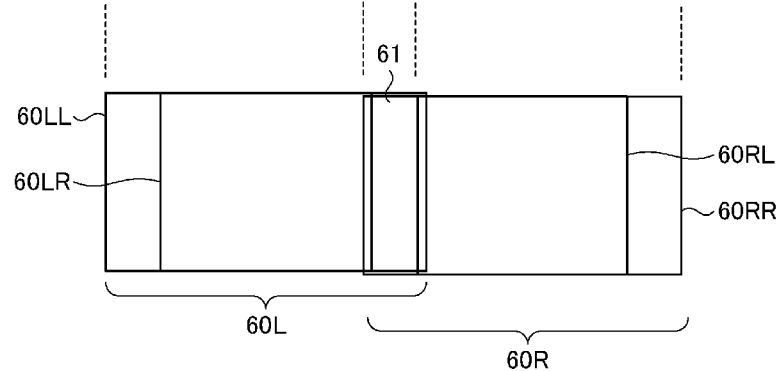

FIGS. 5, 6A and 6B illustrate an example of an image capture range of the stereo camera 6 according to the first embodiment. In FIGS. 5, 6A and 6B, the parts which are the same as those in FIGS. 4A and 4B are denoted by the same reference numerals, and a detailed description thereof will be omitted.

FIG. 5 illustrates the image capture range of the stereo camera 6 in the traveling direction of the vehicle 1 according to the first embodiment. Hereinafter, the image capture range of the stereo camera 6 in the traveling direction of the vehicle 1 is referred to as a traveling direction view field "Vp". Similar to FIGS. 2A and 2B, in FIG. 5, the direction toward the left side is set as the traveling direction of the vehicle 1. As illustrated in FIG. 5, the traveling direction view field "Vp" can be determined in accordance with the angle of view "α" of the stereo camera 6 and the height "h" of the stereo camera 6 relative to the road surface 4.

FIGS. 6A and 6B illustrate the image capture range of the stereo camera 6 in the road width direction of the vehicle 1 according to the first embodiment. FIGS. 6A and 6B illustrate a rear view of the vehicle 1 viewed from the rear side of the vehicle 1, in which the parts which are the same as those in FIG. 4B are denoted by the same reference numerals, and a detailed description thereof will be omitted.

In FIG. 6A, the stereo camera 6L includes, for example, two image capture lenses 6LL and 6LR. The line connecting the image capture lenses 6LL and 6LR is referred to as the baseline, the length of the baseline is referred to as the baseline length, and the stereo camera 6L is disposed at one position by setting the baseline perpendicular to the traveling direction of the vehicle 1. Further, the stereo camera 6R also includes, for example, two image capture lenses 6RL and 6RR spaced apart each other by the baseline length, and the stereo camera 6R is disposed at another position by setting the baseline perpendicular to the traveling direction of the vehicle 1.

FIG. 6B illustrates an example of the image capture range of the stereo cameras 6L and 6R according to the first embodiment. As to the stereo camera 6L, the image capture ranges 60LL and 60LR, respectively corresponding to the image capture lenses 6LL and 6LR, are partially overlapped with each other in accordance with the baseline length and the height "h." Similarly, as to the stereo camera 6R, the image capture ranges 60RL and 60RR, respectively corresponding to the image capture lenses 6RL and 6RR, are partially overlapped with each other in accordance with the baseline length and the height "h."

Hereinafter, unless otherwise noted, the image capture ranges 60LL and 60LR are collectively referred to as the stereo image capture range 60L, and the image capture ranges 60RL and 60RR are collectively referred to as the stereo image capture range 60R, respectively. When the stereo cameras 6L and 6R are arranged at given positions as illustrated in FIG. 6A, the stereo image capture ranges 60L and 60R partially overlap at one end of the stereo image capture range 60L in the width direction of the vehicle 1 (width direction of road, lateral direction) and one end of the stereo image capture range 60R in the width direction of the vehicle 1 with a given overlapping ratio, which is indicated as an overlapping portion 61 as illustrated in FIG. 6B.

In this description, the "width direction" indicates not only the width direction of the vehicle 1 but also the width direction of a road (traveling surface), the crosswise direction of the road (traveling surface), and the direction perpendicular to the traveling direction of the vehicle 1. Further, as to the definition of the width direction, the road can be any road, such as straight roads extending in a straight direction or roads curved to the left or right in the traveling direction. In this description, the width direction of the road and the crosswise direction of the road can be defined, for example, using the width between two opposed sidewalks on either side of the road, and the width between two opposed white lines on either side of the road (i.e., lane width).

Figure 7:
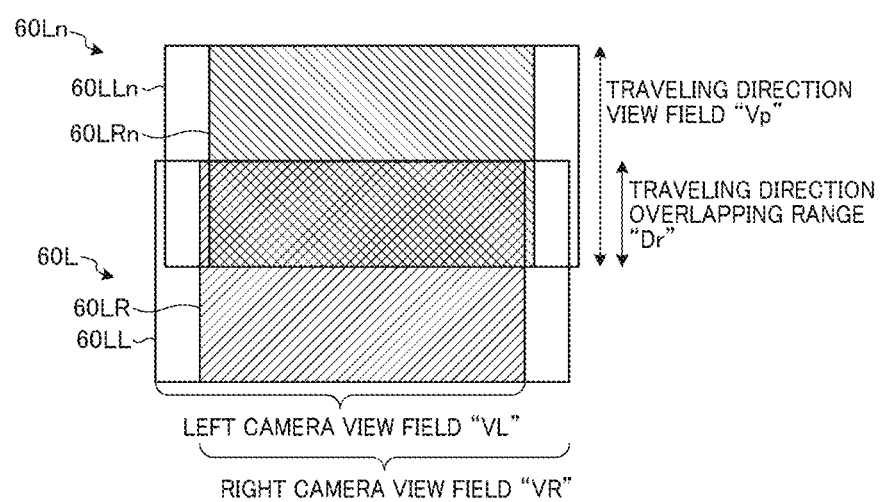
FIG. 7 illustrates an example of overlapping of a plurality of stereo image capture ranges of a plurality of stereo cameras in a traveling direction of a vehicle according to the first embodiment.

FIG. 7 illustrates an example of an overlapping of a plurality of the stereo image capture ranges 60L of the stereo camera 6L in the traveling direction of the vehicle 1 according to the first embodiment. In FIG. 7, a left camera view field "VL" indicates a field of view (i.e., image capture range) of the image capture lens 6LL and a right camera view field "VR" indicates a field of view (i.e., image capture range) of the image capture lens 6LR disposed in the stereo camera 6L. In this example case of FIG. 7, it is assumed that the stereo camera 6L has performed the image capture operation twice while the vehicle 1 moves along the traveling direction. The stereo camera 6L performs a first image capturing operation in the stereo image capture range 60L (the image capture ranges 60LL and 60LR) as the first time image capturing, and then performs a second image capturing operation in the stereo image capture range 60Ln (the image capture ranges 60LLn and 60LRn) as the second time image capturing, in which the stereo image capture range 60L shifts to the stereo image capture range 60Ln in the travelling direction of the vehicle 1 for a distance corresponding to the travel distance of the vehicle 1.

When the stereo camera 6L is performing the image capture operation twice while the vehicle 1 is moving in the traveling direction, the image capture timing of the stereo camera 6L is controlled so that the stereo image capture range 60L and the stereo image capture range 60Ln can overlap each other by a traveling direction overlapping range "Dr" in the traveling direction view field "Vp." The travelling direction overlapping range may be set in advance. In this description, the traveling direction overlapping range "Dr" is a range of overlapping of images in the travelling direction, and a ratio of a size of the overlapped range with respect to a size of the one captured image (that is, the size of the view field "Vp") is referred to as traveling direction overlapping ratio. For the sake of simplicity of expression, hereinafter the size of the view field "Vp" is assumed to be of unit length, so that the traveling direction overlapping range is equal to the traveling direction overlapping ratio, and the term "Dr," is used in this sense in the formula [Math. 4] to be described later. With this configuration, by sequentially capturing the images in the stereo image capture ranges 60L and 60Ln along the time line, two stereo images can be obtained by capturing the images in the stereo image capture ranges 60L and 60Ln, and then the two stereo images be easily stitched together. Therefore, by sequentially capturing the images using the stereo cameras along the time line while the vehicle 1 travels or moves on the road face 4 along the traveling direction, a plurality of stereo images to be used for the road inspection can be acquired.

Figure 8A:
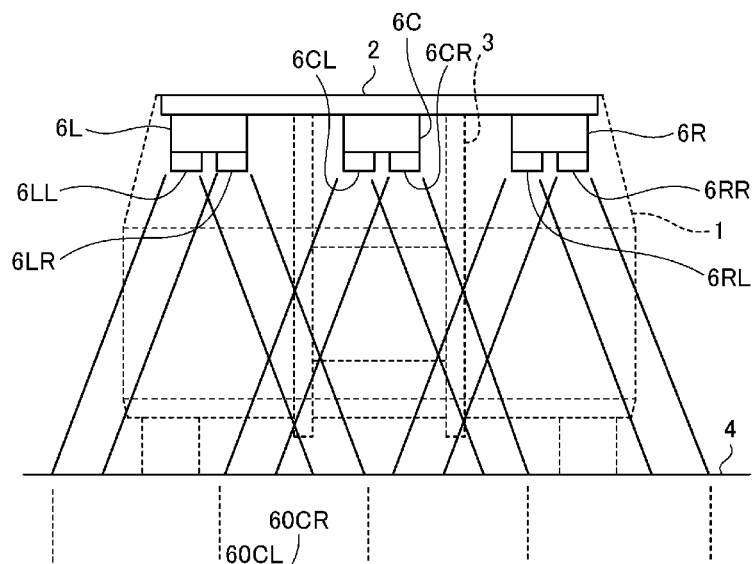
FIGS. 8A and 8B illustrate an example of image capture ranges in a road width direction covered by a plurality of stereo cameras (e.g., three stereo cameras) included in an image processing system according to the first embodiment.

Although the above described image processing system according to the first embodiment uses the two stereo cameras 6L and 6R, the number of stereo cameras is not limited thereto. For example, as illustrated in FIG. 8A, the image processing system according to the first embodiment can further include another one stereo camera, such as a stereo camera 6C in addition to the stereo cameras 6L and 6R to form a configuration using three stereo cameras 6L, 6R, and 6C. Further, four or more of the stereo cameras, such as four and five stereo cameras, can be employed for the image processing system.

Figure 8B:
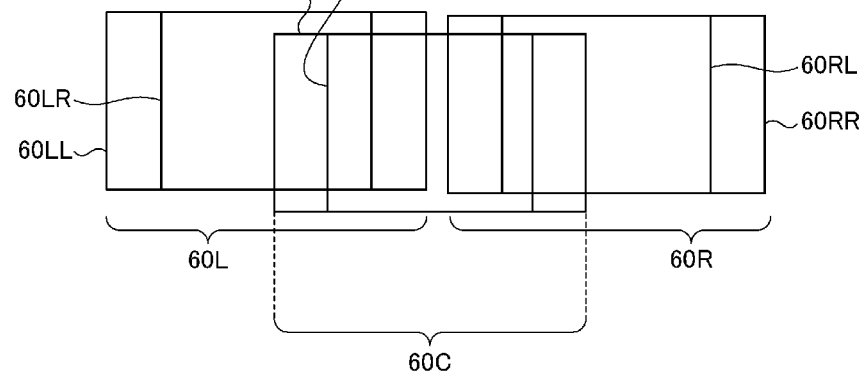

In an example configuration in FIG. 8A, the space between the stereo cameras 6L and 6R is set wider compared to the configuration using the two stereo cameras 6L and 6R of FIGS. 6A and 6B, and the stereo camera 6C is disposed at the center portion of the space between the stereo cameras 6L and 6R. As illustrated in FIG. 8B, the stereo image capture range 60C is defined by the image capture range 60CL and the image capture range 60CR respectively corresponding to the image capture lens 6CL and image capture lens 6CR of the stereo camera 6C. The stereo cameras 6L, 6C, and 6R are arranged at given positions so that the stereo image capture ranges 60L, 60C, and 60R, respectively corresponding to the stereo cameras 6L, 6C, and 6R, overlap with a given overlapping ratio in the width direction of the vehicle 1.

In this configuration, images of one lane can be captured using the three stereo cameras 6L, 6C, and 6R, in which the image capture range is respectively set at each of the right side, the center, and the left side of the same one lane, thereby a stereo image of higher quality (e.g., high resolution image) can be captured using a relatively smaller number of stereo cameras. Typically, the road width is defined as 3.5 meters by, for example, the road regulation. Accordingly, with respect to the road width of 3.5 m, it can be assumed that the stereo cameras 6L and 6R capture an image at each side end of the lane in the road width direction, and the stereo camera 6C captures an image at the center of the lane in the road width direction. The image capture ranges 60L, 60C, and 60R at least span the lane width, with which images of the entire width direction of one lane of the traveling surface can be captured. Further, when four or more of the stereo cameras are used, the images can be captured by setting image capture ranges for the respective stereo cameras.

The captured stereo images are required to be stitched together in the traveling direction of the vehicle (the direction of extending the road) for measuring the crack ratio and the flatness, but the captured stereo images are not required to be stitched together in the traveling direction of the vehicle for measuring the rutting depth. That is, since the measurement of the rutting depth is performed along the width direction of the moveable apparatus (i.e., the width direction of road), the captured stereo images are not required to be stitched together in the traveling direction of the vehicle for measuring the rutting depth, but the stereo images captured by the plurality of stereo cameras are required to be stitched together along the width direction of road.

For example, the road inspection regulations stipulate that the rutting depth is required to be measured at five portions within the 100-m evaluation section of the road surface. In this case, five stereo images are respectively captured at five portions not including a foreign matter (e.g., manhole), and then in each of the five stereo images, the captured images are stitched together to create or generate one depth map to obtain the rutting depth D1 and the rutting depth D2. Based on the obtained rutting depth D1 and rutting depth D2 and cross-section information of the depth map, the rutting depth "D" can be measured. If the rutting depth alone is to be measured, the captured stereo images are not required to be stitched together in the traveling direction of the vehicle and the depth map in the traveling direction of the vehicle is not required to be created or generated, with which amount of processing data can be reduced or saved, and the image processing time can be shortened.

Further, the image processing system can be configured using one stereo camera set with the image capture range corresponding to the angle of view that can cover the road width (e.g., 3.5 m) that is defined by the road regulation.

(Configuration of Image Processing System of First Embodiment)

Hereinafter, a description is given of a configuration of the image processing system according to the first embodiment. Hereinafter, it is assumed that the image processing system includes two stereo cameras.

Figure 9:
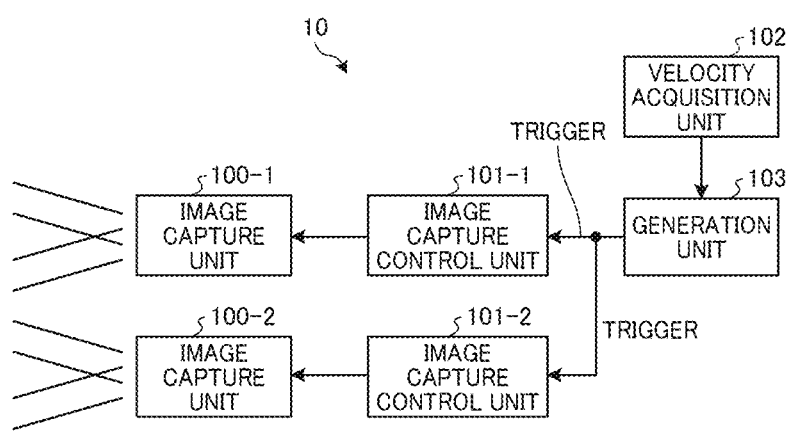
FIG. 9 illustrates an example of a functional block diagram of an image processing system according to the first embodiment.

FIG. 9 illustrates an example of a functional block diagram of the image processing system 10 according to the first embodiment. As illustrated in FIG. 9, the image processing system 10 includes, for example, image capture units 100-1 and 100-2, image capture control units 101-1 and 101-2, a velocity acquisition unit 102, and a generation unit 103.

The image capture units 100-1 and 100-2 respectively correspond to the above described stereo cameras 6L and 6R. The image capture control units 101-1 and 101-2 control the image capture operation, such as image capture timing, exposure level, and shutter speed of the image capture units 100-1 and 100-2, respectively. The velocity acquisition unit 102 acquires a velocity of the image capture unit 100-1 and 100-2 relative to the measurement target (e.g., the road surface 4). The generation unit 103 generates a trigger (i.e., an image capture trigger) used for instructing an image capture operation using the image capture units 100-1 and 100-2 based on the velocity acquired by the velocity acquisition unit 102 and the traveling direction view field "Vp." The generation unit 103 transmits the generated trigger to the image capture control units 101-1 and 101-2. The image capture control units 101-1 and 101-2 respectively cause the image capture units 100-1 and 100-2 to perform the image capture operation in accordance with the trigger transmitted from the generation unit 103.

Figure 10:
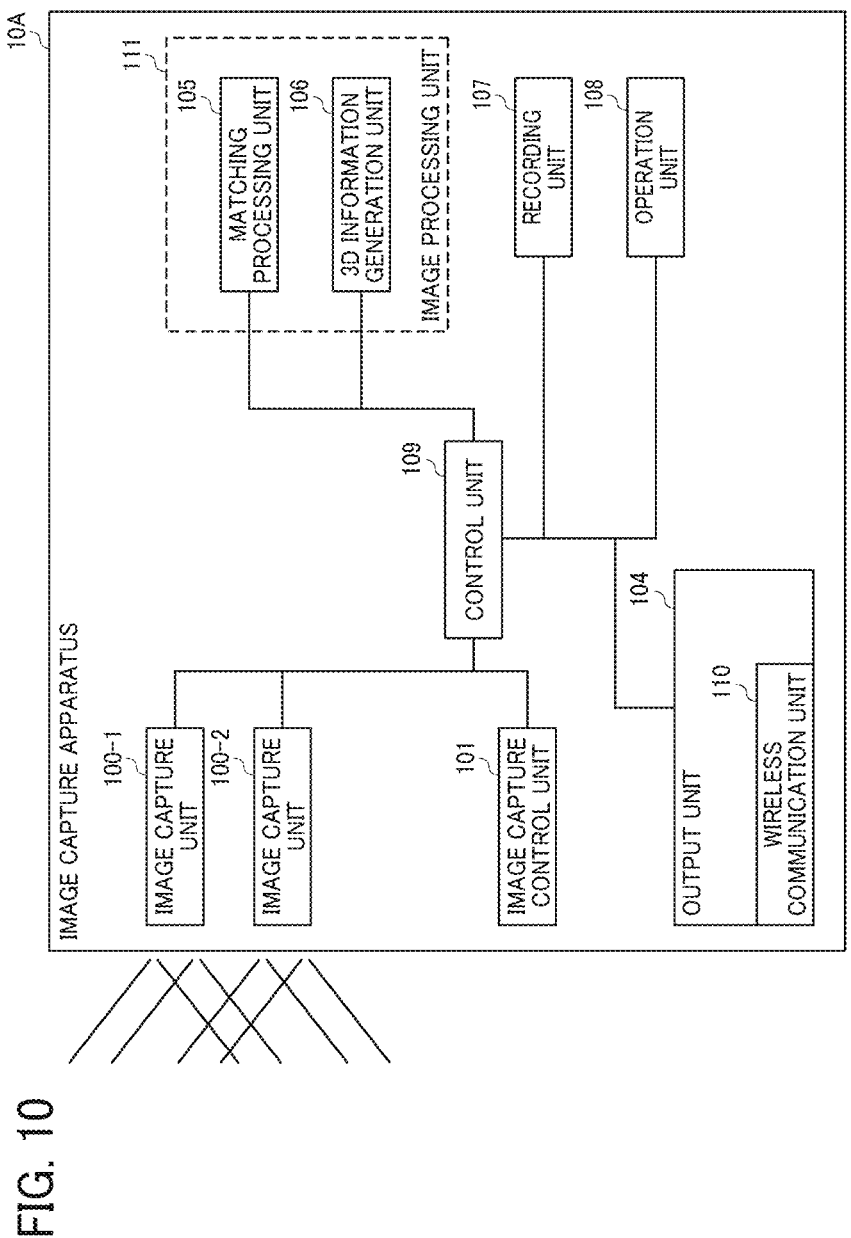
FIG. 10 is an example of a functional block diagram of an image capture apparatus according to the first embodiment.

Further, in this description, an apparatus including at least the image capture unit 100-1 and the image capture unit 100-2 (i.e., stereo cameras 6L and 6R), the image capture control unit 101, and an image processing unit to be described later is referred to as an image capture apparatus 10A. FIG. 10 is an example of a functional block diagram of the image capture apparatus 10A for describing the function of the image capture apparatus 10A. As illustrated in FIG. 10, the image capture apparatus 10A includes, for example, at least two or more image capture units (the image capture units 100-1 and 100-2), an image capture control unit 101 that controls the image capture operation of each of the image capture units, an image processing unit (image processing means) 111, an output unit 104, a recording unit 107, an operation unit 108, and a wireless communication unit 110. The image processing unit 111 includes, for example, a matching processing unit 105 (corresponding to a matching processing unit 510, to be described later), and a three-dimensional (3D) information generation unit 106 (corresponding to a 3D information generation unit 511, to be described later). The image processing unit 111 will be described later in detail.

The recording unit 107 records images captured by each of the image capture units and the stitched images to be described later. The output unit 104 outputs the recorded image data. Specifically, the output unit 104 writes the image data in an external recording medium, such as a smart disk (SD) card or a compact flash (CF) card, and outputs the image data to an external device (e.g., PC, server) via various communication cables. Further, the output unit 104 can also output the image data to the outside using wireless communication via the wireless communication unit 110.

Further, the image capture control unit 101 can be configured as the image capture control units 101-1 and 101-2 as illustrated in FIG. 9 to control the image capture operation using the image capture units 100-1 and 100-2, respectively.

Further, the number of image capture units is not limited to two, such as image capture units 100-1 and 100-2, but can be three, four, five, or more. In this case, the imaging control unit 101 can be configured to be provided with each of the image capture units.

Figure 11:
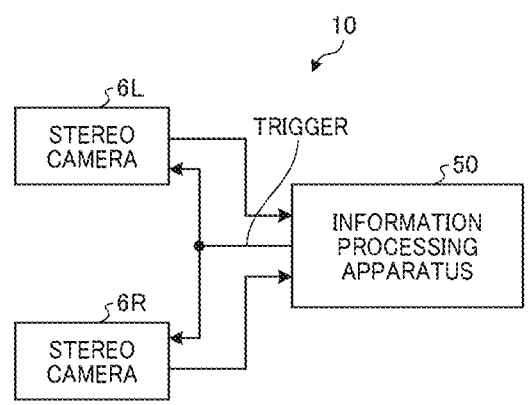
FIG. 11 illustrates an example of a hardware block diagram of an image processing system according to the first embodiment.

FIG. 11 illustrates an example of a hardware block diagram of the image processing system 10 according to the first embodiment. As illustrated in FIG. 11, the image processing system 10 includes, for example, the stereo cameras 6L and 6R, and the information processing apparatus 50 corresponding to the PC 5 of FIGS. 4A and 4B. The information processing apparatus 50 can generate a trigger at a given timing and transmits the generated trigger to the stereo cameras 6L and 6R. The stereo cameras 6L and 6R respectively perform an image capture operation in response to receiving the trigger. The stereo image captured by each of the stereo cameras 6L and 6R is supplied to the information processing apparatus 50. The information processing apparatus 50 stores and accumulates the stereo images supplied from the stereo cameras 6L and 6R in a storage or the like. The information processing apparatus 50 performs the image processing, such as generating depth maps, stitching the generated depth maps, or the like based on the captured stereo images stored in the storage.

Figure 12:
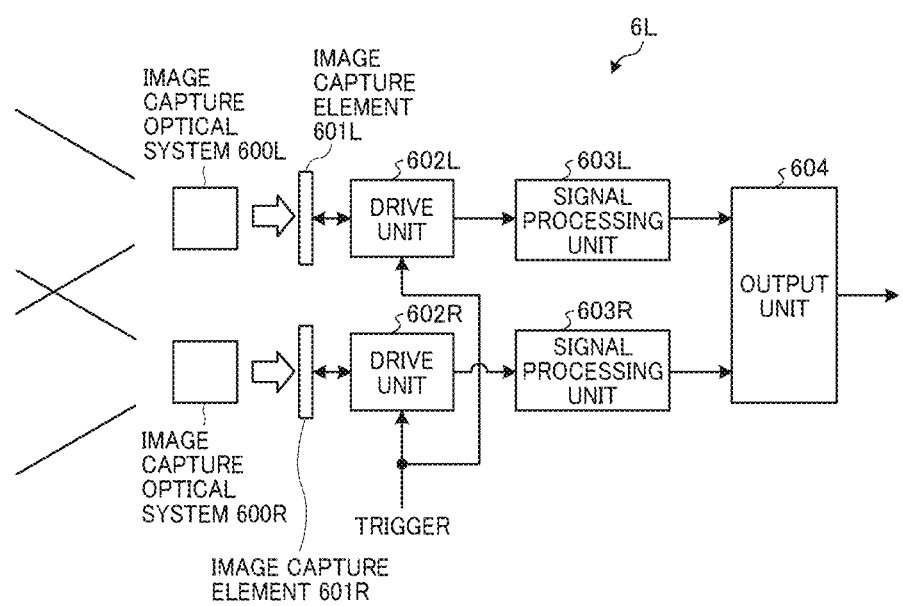
FIG. 12 illustrates an example of a functional block diagram of a stereo camera according to the first embodiment.

FIG. 12 illustrates an example of a functional block diagram of the stereo camera 6L according to the first embodiment. Since the stereo camera 6R can employ the same configuration of the stereo camera 6L, the description thereof will be omitted.

As illustrated in FIG. 12, the stereo camera 6L includes, for example, image capture optical systems 600L and 600R, image capture elements 601L and 601R, drive units 602L and 602R, signal processing units 603L and 603R, and an output unit 604. Among these, the configuration of the image capture optical system 600L, the image capture element 601L, the drive unit 602L, and the signal processing unit 603L are disposed for the above described image capture lens 6LL. Similarly, the configuration of the image capture optical system 600R, the image capture element 601R, the drive unit 602R, and the signal processing unit 603R are disposed for the above described image capture lens 6LR.

The image capture optical system 600L, which is an optical system having an angle of view "α" and a focal length "f," focuses light coming from a target object or measurement object onto the image capture element 601L. The image capture element 601L is, for example, an optical sensor using, for example, complementary metal oxide semiconductor (CMOS), and outputs a signal corresponding to the focused light. Further, an optical sensor employing the charge coupled device (CCD) can be applied to the image capture element 601L. The drive unit 602L drives the image capture element 601L, performs certain processing operations, such as noise removal, gain adjustment, and the like on the signal output from the image capture element 601L, and then outputs the processed signal. The signal processing unit 603L performs an analog-digital (A/D) conversion on the signal output from the drive unit 602L to convert the analog signals into digital image signals (captured image data). The signal processing unit 603L may also perform certain other image processing operations, such as gamma correction, on the converted image signals (digital image signals), and then outputs the converted image signals. The image signals output from the signal processing unit 603L are supplied to the output unit 604.

Since the operation of the image capture optical system 600R, the image capture element 601R, the drive unit 602R, and the signal processing unit 603R is similar to the operation of the image capture optical system 600L, the image capture element 601L, the drive unit 602L, and the signal processing unit 603L, the description thereof will be omitted.

Each of the drive units 602L and 602R is supplied with, for example, the trigger output from the information processing apparatus 50. The drive units 602L and 602R respectively acquire the signals from the image capture elements 601L and 601R in accordance with the trigger to perform the image capture operation.

The drive units 602L and 602R perform exposure of the image capture elements 601L and 601R using a collective simultaneous exposure method.

In the first embodiment, since the image capture operation is performed while the vehicle 1 is running or moving, there is a case that the captured image of the measurement object (e.g., road surface 4) is distorted. This problem becomes prominent for a line-exposure sequential readout method (so-called rolling shutter system) that sequentially reads out pixels of the image capture element one-by-one lines or a plurality of lines collectively. This is because the lines are sequentially read to acquire signals in an order starting from the top pixel position, and each of the lines in one frame does not capture the measurement object at the exact same time. In a case of the rolling shutter system, if the camera or the measurement object moves with a faster velocity while acquiring image capture signals of one frame, the images of the measurement object may be captured with deviation in positions depending on the line positions. From such captured images, it becomes difficult to obtain accurate distance information.

Therefore, the image capture elements 601L and 601R of the stereo cameras 6L and 6R adopt a simultaneous exposure and collective readout method, known as the global shutter system, in which all pixels are read out at the same timing. As a result, even if the image capture operation is performed while the vehicle 1 is running, the shape of the road surface can be captured correctly in the projection geometry without distortion of the road surface, and thereby the distance information can be obtained accurately.

The output unit 604 outputs the captured image of each frame supplied from each of the signal processing units 603L and 603R as one stereo image including a pair of captured images. Then, the stereo image output from the output unit 604 is transmitted to the information processing apparatus 50 and stored, for example, in the information processing apparatus 50.

Figure 13:
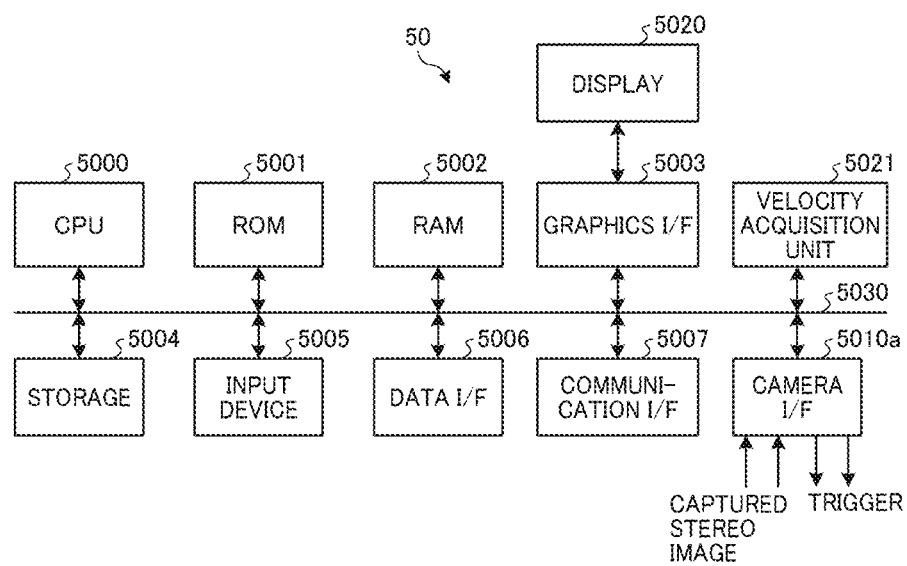
FIG. 13 illustrates an example of a hardware block diagram of an information processing apparatus according to the first embodiment.

FIG. 13 illustrates an example of a hardware block diagram of the information processing apparatus 50 according to the first embodiment. As illustrated in FIG. 13, the information processing apparatus 50 includes, for example, a central processing unit (CPU) 5000, a read only memory (ROM) 5001, a random access memory (RAM) 5002, a graphics interface (I/F) 5003, a storage 5004, an input device 5005, a data I/F 5006, and a communication I/F 5007 connected with each other via a bus 5030. The information processing apparatus 50 further includes, for example, a camera I/F 5010a and a velocity acquisition unit 5021 also connected to the bus 5030.

The storage 5004 is a storage medium, in which data is stored in a nonvolatile state, and the storage 5004 can be a hard disk drive or a flash memory. The storage 5004 stores programs and data for operating the CPU 5000.

For example, the CPU 5000 uses the RAM 5002 as a working memory in accordance with one or more programs stored in the ROM 5001 or the storage 5004 to control the entire operation of the information processing apparatus 50. The graphics I/F 5003 generates a display signal compatible with the display 5020 based on the display control signal generated by the CPU 5000 in accordance with the program. The display 5020 displays a screen corresponding to the display signal supplied from the graphics I/F 5003.

The input device 5005 receives a user operation and outputs a control signal corresponding to the received user operation. As to the input device 5005, a pointing device such as a mouse or a tablet, or a keyboard can be employed. Further, the input device 5005 and the display 5020 can be integrally configured as a touch panel.

The data I/F 5006 transmits and receives data to and from an external device. For example, the universal serial bus (USB) can be employed for the data I/F 5006. The communication I/F 5007 controls communication with an external network in accordance with the instruction of the CPU 5000.

The camera I/F 5010a is an interface to each of the stereo cameras 6L and 6R. Each of the stereo images output from the stereo cameras 6L and 6R is transmitted, for example, to the CPU 5000 via the camera I/F 5010a. Further, the camera I/F 5010a generates the above described trigger in accordance with the instruction of the CPU 5000, and transmits the generated trigger to each of the stereo cameras 6L and 6R.

The velocity acquisition unit 5021 acquires velocity information indicating the velocity of the vehicle 1. If the stereo cameras 6L and 6R are mounted on the vehicle 1, the velocity information acquired by the velocity acquisition unit 5021 indicates the velocity of each of the stereo cameras 6L and 6R relative to the measurement object (e.g., road surface 4). The velocity acquisition unit 5021 may, for example, have a function of receiving a signal from a global navigation satellite system (GNSS) and acquires velocity information indicating the velocity of the vehicle 1 based on the Doppler effect of the signal received from the GNS S. Alternatively or additionally, the velocity acquisition unit 5021 may also acquire the velocity information directly from the vehicle 1.

Figure 14:
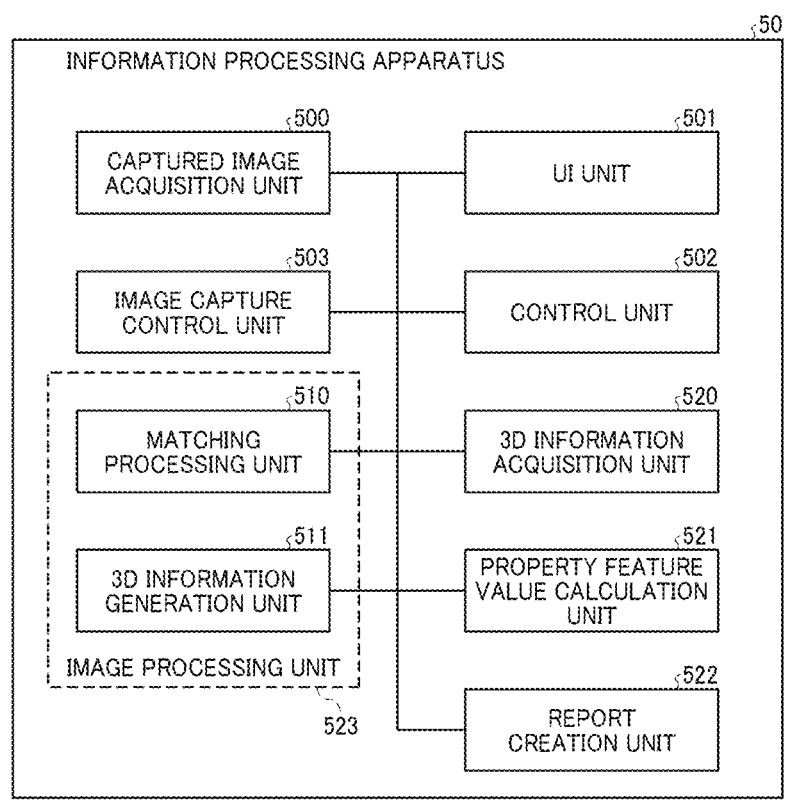
FIG. 14 illustrates an example of a functional block diagram of an information processing apparatus according to the first embodiment.

FIG. 14 illustrates an example of a functional block diagram of the information processing apparatus 50 according to the first embodiment, which is used for describing the functions of the information processing apparatus 50. As illustrated in FIG. 14, the information processing apparatus 50 includes, for example, a captured image acquisition unit 500, a user interface (UI) unit 501, a control unit 502, an image capture control unit 503, and an image processing unit (image processing means) 523. The information processing apparatus 50 further includes, for example, a property feature value calculation unit 521, and a report creation unit 522. The image processing unit 523 includes, for example, a matching processing unit 510 and a three-dimensional (3D) information generation unit 511.

The captured image acquisition unit 500, the UI unit 501, the control unit 502, the image capture control unit 503, the matching processing unit 510, the 3D information generation unit 511, the 3D information acquisition unit 520, the property feature value calculation unit 521, and the report creation unit 522 can be implemented by programs running on the CPU 5000, but not limited thereto. For example, a part or all of the captured image acquisition unit 500, the UI unit 501, the control unit 502, the image capture control unit 503, the matching processing unit 510, the 3D information generation unit 511, the 3D information acquisition unit 520, the property feature value calculation unit 521, and the report creation unit 522 can be configured as one or more hardware circuits that operates cooperatively with each other.

The captured image acquisition unit 500, which functions as an acquisition unit, acquires the stereo image from each of the stereo cameras 6L and 6R. The captured image acquisition unit 500 stores the acquired stereo image in, for example, the storage 5004. Further, the captured image acquisition unit 500 acquires the stored stereo image from, for example, the storage 5004.

The UI unit 501 implements a user interface to be displayed for the input device 5005 and the display 5020. The control unit 502 controls the operation of the information processing apparatus 50 entirely.

The image capture control unit 503, which functions as a control unit, corresponds to the image capture control units 101-1 and 101-2, the velocity acquisition unit 102, and the generation unit 103 described as above. That is, the image capture control unit 503 acquires the velocity information indicating the velocity of each of the stereo cameras 6L and 6R relative to the measurement target (e.g., road surface 4), and generates the trigger for instructing the image capture operation using each of the stereo cameras 6L and 6R based on the acquired velocity information, the angle of view "α" and the height "h" set for each of the stereo cameras 6L and 6R in advance.

The matching processing unit 510, which functions as the image processing unit, performs a matching process using the two images configuring the stereo image, which are acquired by the captured image acquisition unit 500. The 3D information generation unit 511, which functions as the image processing unit, performs processing related to the three-dimensional information. For example, the 3D information generation unit 511 uses a result of the matching process obtained by the matching processing unit 510 to calculate the depth information using the trigonometry or the like, and then generates the three-dimensional point group information based on the calculated depth information.

Hereinafter, the image processing unit (image processing means) 111 is described. The image processing unit 111 performs the stereo matching to the images, which are acquired by the captured image acquisition unit 500, for each of the stereo cameras that have captured the images to arrange the depth distances corresponding to the respective pixels as an image to generate a depth map. In one case, the PC 5 may include the image processing unit, in which the PC 5 acquires a plurality of captured stereo images, and the PC 5 generates the depth map. At this time, the captured stereo image can be configured to record information indicating which specific stereo camera is used for capturing which specific stereo image so that the image processing unit can recognize the positional relationship of the captured images, and then identify the image capture ranges that overlap for the adjacent stereo cameras, to be described later. In another case, the stereo camera 6 may include the image processing unit, in which the stereo camera 6 generates the depth map and the PC 5 acquire the generated depth map. Further, if both the stereo camera 6 and the PC 5 include the image processing unit, any one of the image processing units can be appropriately selected to generate the depth map.

As to a plurality of depth maps, the matching processing unit 510 calculates the relative positions of the stereo cameras to correlate the depth distances of pixels in the images corresponding to the overlapping portion identified in the image capture ranges of the adjacent stereo cameras (that is, the position to stitch the captured images is determined).

Specifically, the image processing can be performed as follows.

The positions are correlated for the plurality of depth maps by the matching processing unit 510. When correlating the positions, the matching processing unit 510 determines whether or not the relative positions of pixels corresponding to the overlapping portion identified in the image capture ranges of the adjacent stereo cameras are matched for the plurality of depth maps. At this time, if the relative position is determined with correlating the luminance of pixels, the accuracy of the position correlation can be improved. The matching method using the depth map can employ Iterative Closest Point (ICP). Further, the matching method using luminance images can employ SfM.

Then, the matching processing unit 510 determines the stitching positions at which relative positions are matched for the plurality of depth maps. Then, the matching processing unit 510 performs a synthesis process to synthesize the plurality of depth maps (images) whose stitching positions are determined as one depth map (image), which may be also referred to as the stitching process.

The 3D information generation unit 511 generates three-dimensional point cloud information for the one depth map (image) synthesized from the plurality of depth maps.

In the above description, the matching processing of "images in the overlapping portion of the image capture ranges of the adjacent stereo cameras" is described, but the matching processing can be also similarly performed to "images in the overlapping range in the traveling direction of the vehicle."

In a case of measuring the rutting depth, the distance information in the width direction of the road (traveling surface) is required, and thereby the matching processing of "images in the overlapping portion of the image capture ranges of the adjacent stereo cameras" is performed. On the other hand, in a case of measuring the flatness, the distance information in the traveling direction of the vehicle on the road is required, and thereby the matching processing of "images in the overlapping range in the traveling direction of the vehicle" is performed.

In the above described example case, the plurality of depth maps are synthesized (stitched) to each other, but a plurality of luminance images alone can be similarly synthesized (stitched) to each other. The luminance image can be obtained, for example, by performing an image capture operation using any one of camera units constituting one stereo camera 6, such as any one of the image capture lens 6LL and 6LR in a case of the stereo camera 6L. In this case, images corresponding to the image capture ranges that overlap at least in the traveling direction of the vehicle can be obtained.

The 3D information acquisition unit 520, which functions as a measurement unit, acquires the three-dimensional point group information generated by the 3D information generation unit 511 for each of the captured stereo images. The property feature value calculation unit 521, which functions as a measurement unit, calculates the property feature values, such as the crack ratio "C," the rutting depth "D," and the flatness "σ" to be used for calculating the MCI based on the three-dimensional point group information acquired by the 3D information acquisition unit 520 and each of the stereo images acquired by the captured image acquisition unit 500. The report creation unit 522 calculates the MCI based on each of the property feature values calculated by the property feature value calculation unit 521, and then creates an inspection report.

One or more programs for implementing each of the functions of the first embodiment in the information processing apparatus 50 can be recorded on a recording medium readable by a computer such as a compact disk (CD), a flexible disk (FD), or a digital versatile disk (DVD) in an installable format or an executable format file, but not limited thereto. For example, the one or more programs can be provided by storing the one or more programs on a computer connected to a network such as the Internet, and downloading the one or more programs via the network. Further, the embodiment can be configured to provide or distribute the one or more programs via the network such as the Internet.

The program implements a module configuration including the captured image acquisition unit 500, the UI unit 501, the control unit 502, the image capture control unit 503, the matching processing unit 510, the 3D information generation unit 511, the 3D information acquisition unit 520, the property feature value calculation unit 521, and the report creation unit 522. As the actual hardware, the CPU 5000 reads out the program from a storage medium such as the storage 5004 and executes the program, and then the respective functional units are loaded onto a main storage device such as the RAM 5002, in which the captured image acquisition unit 500, the UI unit 501, the control unit 502, the image capture control unit 503, the matching processing unit 510, the 3D information generation unit 511, the 3D information acquisition unit 520, the property feature value calculation unit 521, and the report creation unit 522 are generated on the main storage device.

(Method of Generating Trigger in First Embodiment)

Hereinafter, a description is given of a method of generating a trigger used for instructing each of the stereo cameras 6L and 6R to perform the image capturing operation according to the first embodiment. In the first embodiment, the generation unit 103 generates the trigger with a given time interval, which is set to be shorter than a given time period in which the vehicle 1 travels a certain distance at the velocity indicated by the velocity information, to set the image capture range of the stereo cameras 6L and 6R relative to the measurement target (e.g., road surface 4) in view of the movement distance of the vehicle 1 in the traveling direction.

That is, the trigger needs to be generated so that the image capture ranges of the stereo cameras 6L and 6R with respect to the road surface 4 maintain a given overlapping ratio in the traveling direction of the vehicle 1 (i.e., traveling direction overlapping ratio "Dr"). This condition is set to detect a sufficient number of corresponding points to calculate the camera position reliably with higher accuracy in the process of calculating the image capture position from each of the captured stereo images to be described later. The lower limit of the traveling direction overlapping ratio "Dr" can be determined experimentally, such as "60%," but not limited thereto. In this example case, the stereo images are being captured by maintaining the traveling direction overlapping ratio "Dr" at 60% or more.

In the first embodiment, the method of generating the trigger includes, for example, the following three methods.
(1) a method of generating triggers with a constant time interval (first generation method).
(2) a method of generating triggers by detecting a movement velocity of a camera (second generation method).
(3) a method of generating triggers by calculating a movement distance using captured images (third generation method)

(First Generation Method)

Hereinafter, a description is given of the first generation method of the trigger. As to the first generation method, the time interval of generating the trigger can be determined from the maximum velocity "Speed" of the vehicle 1 and a size of the image capture range (a length of the image capture range in the traveling direction of the vehicle 1) during the image capturing operation. In this case, the velocity acquisition unit 5021 acquires the maximum velocity "Speed" of the vehicle 1 in advance based on the system setting values set in the vehicle 1 and/or the user input to the information processing apparatus 50. The image capture control unit 503 acquires the maximum velocity "Speed" from the velocity acquisition unit 5021, and then calculates the time interval of generating the trigger by inputting the acquired maximum velocity "Speed," the traveling direction view field "Vp" and the traveling direction overlapping ratio "Dr" in the following formula [Math. 4]. In this case, the traveling direction overlapping ratio "Dr" applies the above described lower limit value.

$$fps = \frac{Speed}{Vp \times (1 - Dr)} \quad \text{[Math. 4]}$$

The number of triggers to be generated per second, such as trigger frequency per second (fps), can be calculated using the formula [Math. 4]. The inverse of the number of triggers per second such as the trigger frequency per second (fps) becomes a time interval to the next trigger to be generated.

As described with reference to FIG. 5, the traveling direction view field "Vp" can be set based on the height "h" of each of the stereo cameras 6L and 6R from the road surface 4 and the angle of view "α" of each of the stereo cameras 6L and 6R. Actually, the traveling direction view field "Vp" can be set further in consideration of an installation angle of each of the stereo cameras 6L and 6R relative to the road surface 4.

Further, if the vehicle 1 turns to the right or left while moving on the road, the movement of any one of the stereo cameras 6L and 6R disposed at the outward position of the vehicle 1 increases. Therefore, it is preferable to use the velocity of rotational movement corresponding to the stereo camera at the outward position instead of using the maximum velocity "Speed" of the vehicle 1 as it is.

The image capture control unit 503 stores and accumulates all of the stereo images captured in response to the generated triggers in, for example, the storage 5004 and/or the RAM 5002.

(Second Generation Method)

Hereinafter, a description is given of the second generation method of the trigger. While the above described first method is simple to implement, if the vehicle 1 is in a stop state or moves at a lower speed compared to a given velocity, the stereo images are captured with a too-small time interval compared to the maximum velocity "Speed," with which an amount of the accumulated stereo images will increase excessively. In the second generation method, the image capture control unit 503 detects the movement velocity of the camera and generates the trigger in accordance with the detected movement velocity of the camera.

The image capture control unit 503 uses a current velocity of the vehicle 1, indicated by the velocity information acquired by the velocity acquisition unit 5021 as the maximum velocity "Speed" of the formula [Math. 4] to calculate the time interval to the next trigger to perform the image capture operation. As to the second generation method, the smaller (slower) the movement velocity of the vehicle 1, the longer the time interval between the generated triggers, and in this way unnecessary or wasteful image capturing operation can be reduced.

The image capture control unit 503 stores and accumulates all of the stereo images captured in response to the generated triggers in, for example, the storage 5004 and/or the RAM 5002.

It should be noted that the second generation method and the first generation method described above can be performed in combination.

(Third Generation Method)

Hereinafter, a description is given of the third generation method of the trigger. Similar to the first generation method described above, in the third generation method, the triggers are generated with a constant time interval based on the maximum velocity "Speed" of the vehicle 1. In the third generation method, instead of storing all of the stereo images captured in accordance with the generated triggers, the captured stereo images are stored only when the traveling direction overlapping ratio "Dr" becomes smaller than a given pre-set value.

To be described later, the movement distance of the camera (i.e., vehicle 1) can be calculated using only the stereo images, which are captured by overlapping the stereo images in the traveling direction of the vehicle 1.

The image capture control unit 503 calculates the movement distance of the camera using one stereo image (first stereo image) that was stored as the most recent stereo image and another stereo image (second stereo image) that was captured as the latest stereo image, which is right after the most recent stereo image (first stereo image). The image capture control unit 503 determines whether the calculated movement distance of the camera exceeds a given movement distance (i.e., movement distance threshold) corresponding to a lower limit value of the traveling direction overlapping ratio "Dr." If the image capture control unit 503 determines that the calculated movement distance of the camera exceeds the movement distance threshold, the image capture control unit 503 stores the latest stereo image that was captured as the latest image. On the other hand, if the image capture control unit 503 determines that the calculated movement distance of the camera does not exceed the movement distance threshold, the image capture control unit 503 discards the latest stereo image that was captured as the latest image. In other words, if the image overlapping ratio between the first stereo image (the most recent stereo image) and another stereo image (the latest stereo image) is equal to or less than a threshold value, it means that the calculated movement distance of the camera does not exceeds the movement distance threshold, in which the latest stereo image that was captured as the latest image is discarded.

With this configuration, even if a sensor for measuring the velocity of the vehicle 1 is not used, unnecessary image accumulation can be reduced, in particular can be prevented when the movement velocity is smaller (slower). Further, the unnecessary image accumulation will not be performed when the movement velocity is zero (i.e., the vehicle 1 is not moving).

(Method of Calculating Value of Road Surface Properties According to First Embodiment)

Hereinafter, a description is given of a method of calculating the value of road surface properties according to the first embodiment. In the following description, a method of measuring the flatness "σ," the rutting depth "D," and the crack ratio "C" according to the first embodiment is described.

(Flatness)

Figure 15:
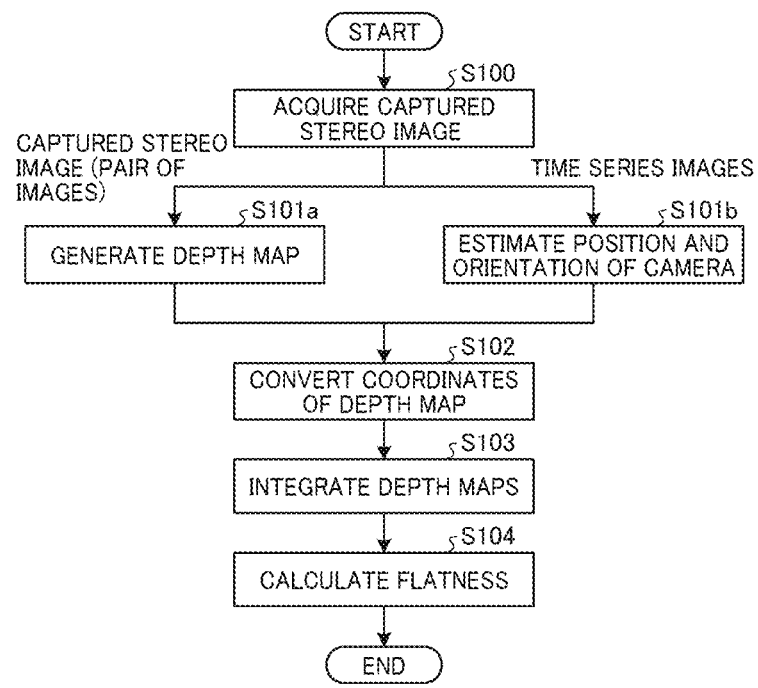
FIG. 15 is an example of a flowchart illustrating a process of calculating flatness according to the first embodiment.

FIG. 15 is an example of a flowchart illustrating a process of calculating the flatness according to the first embodiment. In step S100, the captured image acquisition unit 500 acquires the stereo images captured by the stereo camera 6L and 6R and stores the captured stereo images in, for example, the storage 5004. In response to acquisition of the captured stereo images, the sequence proceeds to steps S101a and S101b, which can be processed in parallel or concurrently.

Figure 16:
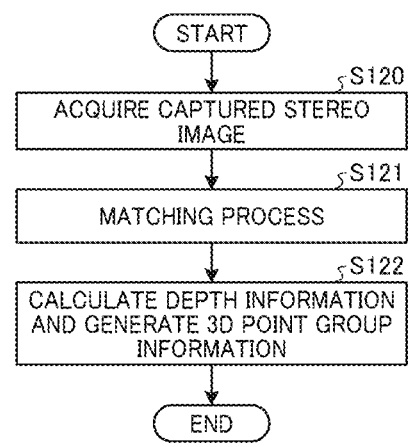
FIG. 16 is an example of a flowchart illustrating a process of generating a depth map according to the first embodiment.

In step S101a, the image processing unit 523 generates a depth map based on the captured stereo images acquired in step S101. Hereinafter, a description is given of the processing of generating the depth map according to the first embodiment with reference to FIGS. 16 and 17. FIG. 16 is an example of a flowchart illustrating a process of generating the depth map according to the first embodiment.

In step S120, the matching processing unit 510 acquires the captured stereo image from the captured image acquisition unit 500. In step S121, the matching processing unit 510 performs the matching process using the two captured images configuring the acquired stereo image. In step S122, the 3D information generation unit 511 calculates the depth information based on the matching processing result obtained in step S121 to generate the depth map, which is the three-dimensional point group information.

The processing of steps S121 and S122 are described in more detail. In the first embodiment, the depth information is calculated using the two captured images configuring the stereo image by applying the stereo method. As to the stereo method, a first image is captured by a first camera disposed at a first viewpoint and a second image is captured by a second camera disposed at a second viewpoint, different from the first viewpoint, then a pixel in the captured first image (reference pixel) and a pixel in the captured second image (corresponding pixel) corresponding the reference pixel are identified, and then the depth information (depth distance) is calculated based on the reference pixel and the corresponding pixel by applying the trigonometry.

In step S121, the matching processing unit 510 uses the captured two images configuring the stereo image, acquired from the captured image acquisition unit 500, to search for a second area in the captured second image (i.e., search target image), which may correspond to a first area having a given size and setting the reference pixel as the center in the first area of the captured first image (used as the reference image) by shifting the second area within the captured second image.

The corresponding pixel can be searched for using known methods, such as the block matching method, and the semi-global-matching (SGM) propagation method.

As to the block matching method, a first block of "M pixels×N pixels" having the reference pixel at the center of the first block in one captured image (captured first image) is cut out as the first area, and pixel values of the first area are acquired. Further, in another captured image (captured second image), a second block of "M pixels×N pixels" having the corresponding pixel at the center of the second block in another captured image (captured second image) is cut out, and pixel values of the second area are acquired. Then, based on the pixel values of the first area and the second area, the level of similarity between the first area including the reference pixel and the second area including the target pixel is calculated. The similarity level is being compared while repeatedly shifting the second block of "M pixels×N pixels" in the search target image (captured second image), and the pixel in the second block that is at the position where the similarity level becomes the highest is determined as the pixel corresponding to the reference pixel.

Hereinafter, a description is given of the SGM propagation method. The matching processing unit 510 calculates the propagation cost Lr using an algorithm of the SGM propagation method, and performs energy calculation processing for calculating the energy cost S(p,d) of the concerned pixel "p" using the propagation cost Lr (e.g., propagation cost L1). The SGM propagation method is one form of a dense algorithm. For example, the energy cost S(p,d) of each pixel can be calculated using the following formulas [Math. 5] and [Math. 6].

$$L1(p, d) = C(p, d) + \min\{L1(p-1, d), L1(p-1, d-1) + P1,$$
$$L1(p-1, d+1) + P1, \min_i L1(p-1, i) + P2\}.$$
[Math. 5]

In the formula [Math. 5], "p" denotes the coordinates of the pixel, "d" denotes a disparity, and "P1" and "P2" are parameters specifically used for the SGM algorithm, known as penalty values, and the values of P1 and P2 differently set for each of the propagation directions can be used effectively in the SGM propagation method.

The energy cost S (p, d) of each pixel can be calculated using the following formula [Math. 6] based on the propagation cost from each direction calculated for each pixel.

$$S(p, d) = \sum_r Lr(p, d)$$
[Math. 6]

The similarity level can be calculated using various calculation methods. For example, the normalized cross correlation (NCC) indicated in the formula [Math. 7] is one example of the cost functions, and the higher the numerical value $C_{NCC}$ indicating the cost, the higher the level of similarity. In the formula [Math. 7], the values of M and N represent the size of the pixel block used for searching. Further, the value of I(i,j) denotes the pixel value of the pixel in the pixel block in one captured image used as the reference image, and the value of T(i,j) denotes the pixel value of the pixel in the pixel block in another captured image, which is a search target.

$$C_{NCC} = \frac{\sum_{j=0}^{N-1}\sum_{i=0}^{M-1} I(i, j)T(i, j)}{\sqrt{\sum_{j=0}^{N-1}\sum_{i=0}^{M-1} I(i, j)^2 \sum_{j=0}^{N-1}\sum_{i=0}^{M-1} T(i, j)^2}}$$
[Math. 7]

As described above, the matching processing unit 510 performs the calculation of the formula [Math. 7] while shifting the second pixel block in another captured image (captured second image) corresponding to the first pixel block of "M pixels×N pixels" in one captured image (captured first image), for example, with a unit of pixel in another captured image (captured second image) to calculate the numerical value $C_{NCC}$. Then, the center pixel of the second pixel block in another captured image (captured second image), where the numerical value $C_{NCC}$ becomes the maximum, is determined as the pixel corresponding to the reference pixel.

Further, other methods of calculating the similarity level (correlation value), which can be used in the embodiment include, for example, Sum of Absolute Difference (SAD), Sum of Squared Difference (SSD), and Zero Mean Normalized Cross-Correlation (ZNCC).

The SAD is a method of calculating the sum of the absolute value of the difference in luminance values as indicated in the following formula [Math. 8]. As to the SAD, the smaller the value, the higher the similarity level of the pixel blocks.

$$SAD = \sum_y \sum_x |A(x, y) - B(x, y)|$$
[Math. 8]

As indicated in the following formula [Math. 9], the SSD squares the difference of luminance values, and then calculates the sum of the squared difference of luminance values. As to the SSD, the smaller the value, the higher the similarity level of the pixel blocks.

$$SSD = \sum_y \sum_x (A(x, y) - B(x, y))^2$$
[Math. 9]

The ZNCC is a method of calculating the normalized cross-correlation after subtracting the average value as indicated in the following formula [Math. 10].

$$ZNCC = \frac{\sum_y \sum_x (A(x, y) - \overline{A})(B(x, y) - \overline{B})}{\sqrt{\sum_y \sum_x (A(x, y) - \overline{A})^2 \sum_y \sum_x (B(x, y) - \overline{B})^2}}$$
[Math. 10]

$$\overline{A} = \frac{1}{MN} \sum_y \sum_x A(x, y),$$

$$\overline{B} = \frac{1}{MN} \sum_y \sum_x B(x, y)$$

The description returns to FIG. 16. In step S122, the 3D information generation unit 511 calculates the depth distance (depth information) based on the reference pixel and the corresponding pixel determined by the matching process in step S121 by applying the trigonometry, and then generates the three-dimensional point group information related to the captured first image and another captured image (captured second image) constituting the stereo image.

Figure 17:
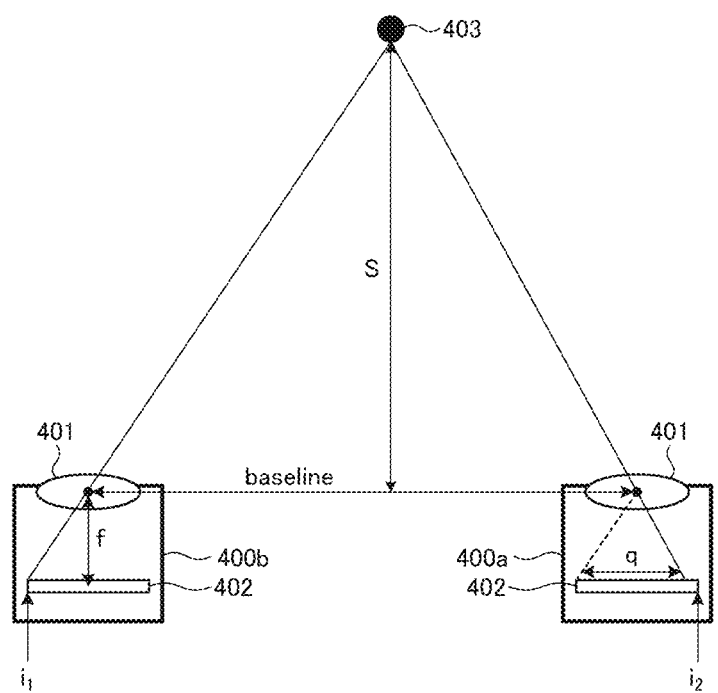
FIG. 17 illustrates a scheme of the trigonometry according to the first embodiment.

FIG. 17 illustrates a scheme of the trigonometry according to the first embodiment. In FIG. 17, the trigonometry is used to calculate distance S to a target object 403 (e.g., one point on the road surface 4) based on the image capture position information in the images captured by each of image capture elements 402, corresponding to the image capture elements 601L and 601R. That is, the distance S corresponds to the depth information of the target pixel. The distance S can be calculated using the following formula [Math. 11].

In the formula [Math. 11], a value of "baseline" represents a length of the baseline between cameras 400a and 400b (baseline length). In an example case of FIGS. 6A and 6B, the value "baseline" corresponds, for example, to the baseline length set for the image capture lenses 6LL and 6LR of the stereo camera 6L. In the formula [Math. 11], a value of "f" denotes the focal length of the lens 401 (corresponding to the image capture lenses 6LL and 6LR). In the formula [Math. 11], a value of "q" denotes the disparity. The disparity "q" is a value obtained by multiplying the difference between the coordinate values of the reference pixel and the corresponding pixel to the pixel pitch of the image capture element. The coordinate values of the corresponding pixel can be obtained from the result of the matching process in step S121.

$$S = \frac{f \times \text{baseline}}{q}$$ [Math. 11]

The formula [Math. 11] is used for calculating the distance S when the two cameras 400a and 400b (i.e., the image capture lenses 6LL and 6LR) are utilized. In this method, the distance S is calculated from the images captured by the two cameras 400a and 400b (i.e., the image capture lenses 6LL and 6LR), respectively. In the first embodiment, the calculation method using the formula [Math. 11] is applied to each of the images captured by the image capture lenses 6LL and 6LR of the stereo camera 6L and each of the images captured by the image capture lenses 6RL and 6RR of the stereo camera 6R to calculate the distance S for each pixel.

The description returns to FIG. 15. In step S101b, the 3D information generation unit 511 estimates the position and orientation of the camera. In this description, it is assumed that the camera position corresponds to, for example, the center coordinates of the stereo camera 6L when the stereo camera 6L is regarded as one unit. The details of step S101b will be described later.

After completing steps S101a and S101b, the sequence proceeds to step S102. In step S102, as to the two depth maps next to each other along the time line (i.e., a first depth map at the first time (most recent time), a second depth map at the second time (latest time) after the first depth map), the 3D information generation unit 511 converts coordinates of the second depth map, right after the first depth map, to correlate the coordinate system of the second depth map to the coordinate system of the first depth map based on the position and the orientation of the camera estimated in step S101b.

We now define two terms which are used below: the "most recent time" and the "latest time." When a first image capture operation and a second image capture operation were performed by the stereo cameras 6L and 6R sequentially along the time line, the first time when the first image capture operation was performed is referred to as the "most recent time" while the second time when the second image capture operation was performed is referred to as the "latest time." That is, the first depth map of the most recent time is the depth map generated based on the stereo image captured by the first image capture operation while the second depth map of the latest time is the depth map generated based on the stereo image captured by the second image capture operation.

In step S103, the 3D information generation unit 511 integrates the second depth map of the latest time converting the coordinates in step S102 to the first depth map of the most recent time. That is, since the first depth map of the most recent time and the second depth map of the latest time are correlated into the common coordinate system by performing the coordinate conversion in step S102, the two depth maps can be integrated. The processing in steps S102 and S103 are performed on the stereo images captured at all time points.

As illustrated in FIGS. 6A, 6B, 8A and 8B, if a plurality of stereo cameras, such as the stereo cameras 6L and 6R or the stereo cameras 6L, 6C and 6R are arranged along the road width direction, the camera position and orientation are similarly estimated for the stereo cameras (e.g., stereo cameras 6L and 6R) arranged in the road width direction, and then the depth maps are integrated.

Further, in the above described third generation method, the movement distance of the camera (i.e., vehicle 1) can be calculated by performing the coordinate conversion in step S102 and performing the depth map integration in step S103.

In step S104, the 3D information acquisition unit 520 acquires the depth map integrated in step S103 from the 3D information generation unit 511. Then, the property feature value calculation unit 521 calculates the flatness "σ" based on the depth map acquired by the 3D information acquisition unit 520. That is, when the depth maps are integrated, the shape of the road surface corresponding to the measured section is generated as a point group in one three-dimensional space. When the point group in the three-dimensional space is generated, a coordinate system connecting coordinates of each one of the sampling points on the road surface, such as points set with the 1.5-m interval in accordance with the road inspection regulation, is generated, then by calculating the distance to the three-dimensional point group at the center portion, the deviation amount "d" can be calculated similar to the formula [Math. 2], and then the flatness "σ" can be calculated from the deviation amount "d" using the formula [Math. 3].

(Rutting Depth)

As to the rutting depth D, in step S104, the property feature value calculation unit 521 scans the depth map acquired by the 3D information acquisition unit 520 in the road width direction to acquire the rutting depth D1 and the rutting depth D2 illustrated in FIGS. 2A and 2B. Then, the rutting depth "D" can be calculated from the acquired rutting depth D1 and rutting depth D2 and information of the cross section obtained by scanning the depth map.

Hereinafter, a description is given of a measurement of the rutting depth "D" in more detail.

It is assumed that N (e.g., two to three) stereo cameras 6 capture images synchronously. More specifically, the N (e.g., two to three) stereo cameras 6 are designed to reduce fluctuation in the transmission delay of the image capture trigger (signal) to synchronously capture images.

The captured image acquisition unit 500 acquires the captured stereo images.

The image processing unit 523 generates the depth map arranging the depth distance corresponding to each pixel as an image by performing the stereo matching for each stereo camera.

When a plurality of depth maps is generated, the matching processing unit 510 calculates the relative positions of the plurality of stereo cameras, adjacent one to another, to correlate the depth distances of images in the overlapping portion of the image capture ranges of the adjacent stereo cameras to determine the stitching position of a plurality of images next to each other (i.e., stitching position is determined). At this time, it is preferable to correlate the luminance of pixel in addition to the depth distance. Then, the matching processing unit 510 performs a synthesizing process to synthesize a plurality of depth maps (images), whose stitching positions are determined, into one depth map (image).

Then, the 3D information generation unit 511 generates one integrated point cloud data (distance information) from the synthesized one depth map (image).

Figure 18:
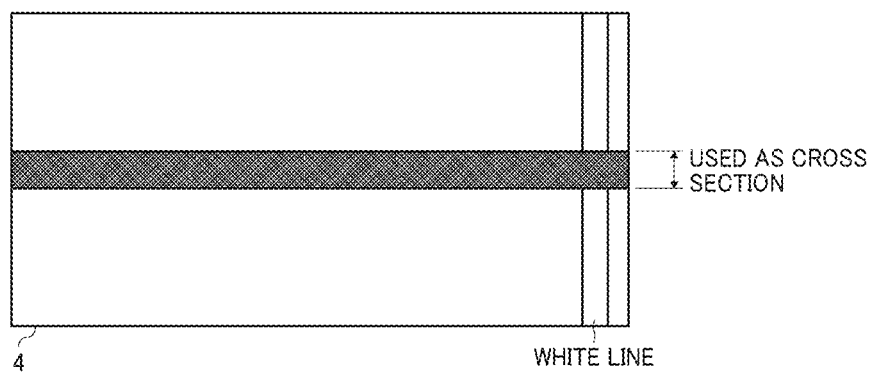
FIG. 18 is a diagram illustrating an example of an image of a road surface.

Then, the property feature value calculation unit 521 overlays the point cloud data (distance information) over an image of the road face to generate a road surface image including the distance information. FIG. 18 illustrates an example of an image of the road surface 4. As illustrated in FIG. 18, the property feature value calculation unit 521 sets an average value of the depth distance Z of the point cloud data in a given width (e.g. 1 cm) as a cross section. At this time, the property feature value calculation unit 521 detects a side end of the road surface 4 (i.e., traveling surface), such as a white line and road edge (grass, soil, grooves, etc.) and any foreign matter in the road surface 4 (i.e., traveling surface), such as a manhole, and any road signs marked on the road surface, and excludes these detected matter (i.e. foreign matter or road signs) from the measurement of the depth distance (i.e., rutting depth) because these detected matter may cause incorrect values of the measurement of the depth distance (i.e., rutting depth).

Figure 19A:
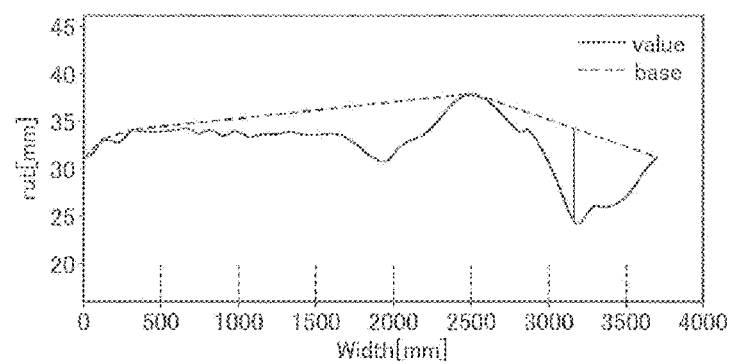
FIGS. 19A and 19B are examples of diagrams describing a measurement of a value of rutting depth.
Figure 19B:
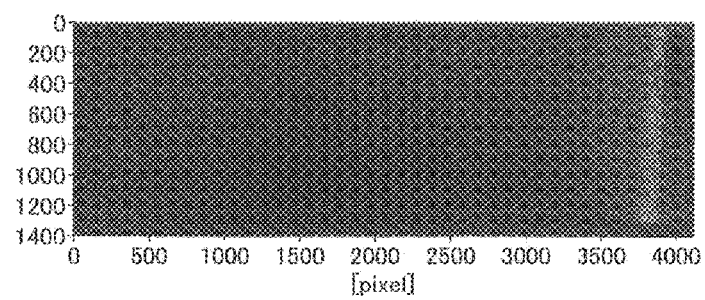

FIGS. 19A and 19B are examples of a diagram describing a measurement of a value of the rutting depth. FIG. 19A shows the value of the rutting depth and FIG. 19B shows a road surface image. As indicated in FIG. 19A, the value of the rutting depth is calculated by determining a presumed surface profile (i.e., "base" in FIG. 19A) for the to-be inspected cross section area and calculating the maximum value of the line length extended to the most convex point (i.e., "value" in FIG. 19A) from the presumed surface profile with the right angle with respect to the presumed surface profile. As indicated in FIGS. 2A and 2B, the rutting depth can be measured by drawing the line from the presumed surface profile (i.e., a line extending across one lane in FIG. 2A) to a profile indicating the measured depth values (i.e., a bold line in FIG. 2A) at a right angle with respect to the presumed surface profile. Therefore, in FIG. 19A, the line extended to the most convex point also has the right angle with respect to the presumed surface profile actually, but due to the modification of scale ratio of the vertical and the horizontal axes of the diagram in FIG. 19A, it seems like that the extended line may be slightly inclined with respect to the presumed surface profile in FIG. 19A. However, as above described, the line extended from the presumed surface profile in FIG. 19A is actually the line setting the right angle with respect to the presumed surface profile.

(Crack Ratio)

The property feature value calculation unit 521 applies the captured stereo image acquired in step S100 to the depth map integrated in step S103. That is, the property feature value calculation unit 521 integrates each of the stereo images captured in the traveling direction of the vehicle 1 by overlapping the stereo images with the traveling direction overlapping ratio "Dr." Then, the property feature value calculation unit 521 sets the 50-cm mesh to the integrated image in accordance with the inspection regulation, acquires information such as cracks and patching in each mesh by performing the image analysis, and then calculates the crack ratio "C" based on the acquired information.

(Estimation of Position and Orientation of Camera)

Figure 20:
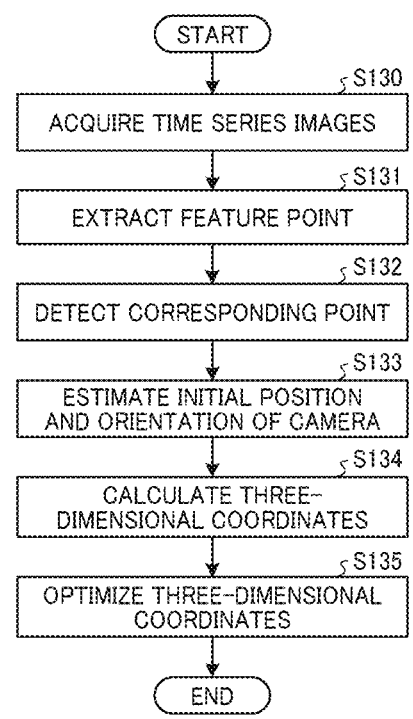
FIG. 20 is an example of a flowchart illustrating a process of estimating position and orientation of a camera according to the first embodiment.

Hereinafter, a description is given of a process of estimating the position and orientation of the camera in step S101b in the flowchart of FIG. 15 in more detail. FIG. 20 is an example of a flowchart illustrating a process of estimating the position and orientation of the camera according to the first embodiment. In the first embodiment, the position and orientation of the camera can be estimated using the above described SfM.

In step S130, the 3D information generation unit 511 acquires the stereo image from the captured image acquisition unit 500. In step S130, the 3D information generation unit 511 acquires two stereo images sequentially captured as time series images (e.g., a stereo image captured at the most recent time, and a stereo image captured at the latest time). In step S131, the 3D information generation unit 511 extracts one or more feature points from each of the acquired stereo image images. The feature point extraction process is performed to detect one or more points that are easily detectable as one or more corresponding points of each stereo image, and typically, the feature point extraction process is performed to detect a point that is referred to as a "corner" where a change occurs in an image and the change is not uniform.

In step S132, the 3D information generation unit 511 detects a point that captures a position, which corresponds to the point extracted as the feature point in the stereo image of the most recent time, from the stereo image of the latest time. This detection process can be performed using a technique called as the optical flow, and the feature point matching method, such as Scale-Invariant Feature Transform (SCALE) and Speed-Upped Robust Feature (SURF), can be applied.

In step S133, the 3D information generation unit 511 estimates an initial position and orientation of the camera. In step S134, the 3D information generation unit 511 sets the coordinates of the corresponding point detected in each of the stereo images in step S132 as a fixed value, and solves simultaneous equations using the position and orientation of the camera that captures the latest time stereo image as the parameters to estimate the position of the camera, and then calculates the three-dimensional coordinates.

Hereinafter, a description is given of a method of estimating the initial position and orientation of the camera with reference to FIG. 21. The following formula [Math. 12] represents a relationship of coordinates "$x_{ij}$" when the point Xj in the space is projected onto the camera (viewpoint) Pi. In the formula [Math. 12], a value of "n" denotes the number of points in the three-dimensional space and a value of "m" denotes the number of cameras (captured images).

$$x_{i,j}=P_i X_j, i=1,\ldots,m, j=1,\ldots,n,$$ [Math. 12]

Each value of "P" is a projection matrix for converting coordinates of the point in the three-dimensional space into two-dimensional coordinates of the same image for each camera, and represented by the following formula [Math. 13]. The formula [Math. 13] is defined by a conversion matrix of two rows and two columns of three-dimensional coordinates, and a projective conversion "fi" for converting the three-dimensional coordinates to the two-dimensional coordinates as indicated on the right side of the formula [Math. 13].

$$P_i = f_i \begin{pmatrix} R_i & T_i \\ 0 & 1 \end{pmatrix} \quad \text{[Math. 13]}$$

Figure 21:
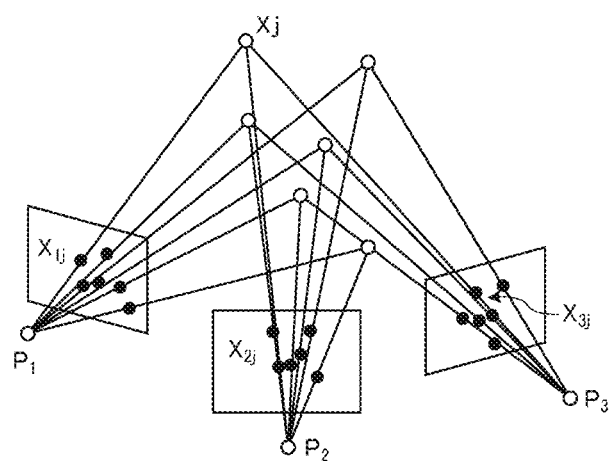
FIG. 21 is a diagram schematically illustrating an estimation process of position and orientation of a camera according to the first embodiment.

In a case of FIG. 21, the value of "Xj" and the value of "Pi" are calculated using simultaneous equations provided with only the coordinates "$x_{ij}$" projected on the camera. The linear least squares method can be used to solve the simultaneous equations.

In step S135, the 3D information generation unit 511 optimizes the three-dimensional coordinates indicating the camera position calculated in step S134. The position and orientation of the camera calculated by solving the simultaneous equations may not have sufficient accuracy. Therefore, by optimizing the calculated value as an initial value, the accuracy of the position and orientation of the camera can be improved.

The difference between the coordinates of the corresponding point, acquired by searching in the image, and the two-dimensional coordinates "$x_{ij}$" (referred to as re-projection coordinates), calculated by the formula [Math. 12] using the three-dimensional coordinates calculated in step S134 and the projection matrix of the formula [Math. 13] as the parameters, is referred to as residual difference. The parameters are adjusted by performing the optimization operation so that the sum of the residual difference can be minimized for all of the corresponding points in all of the stereo images used for calculating the position and orientation of the camera. This is referred to as the bundle adjustment. By performing the total optimization by applying the bundle adjustment, the accuracy of position and orientation of the camera can be improved.

The above described processing is the base processing for estimating the position and orientation of the camera using the normal SfM. In the first embodiment, since the stereo cameras 6L and 6R having the known baseline length are used, in addition to the detection of the corresponding points in the stereo images captured by overlapping the image capture ranges in accordance with the movement of the vehicle 1, the corresponding points in the two captured images configuring the stereo image can be searched easily. Therefore, the three-dimensional coordinates "Xj" in the space can be determined with the actual scale (actual size), and the position and orientation of the camera after the movement can be also calculated reliably.

As to the above described image processing system 10 according to the first embodiment, the trigger is generated in the information processing apparatus 50, and the generated trigger is provided to each one of the cameras, such as the stereo cameras 6L and 6R, with which the image capture operation can be performed by each of the stereo cameras 6L and 6R with a synchronized manner. In this configuration, there is a possibility that a slight deviation occurs in the timing when the stereo cameras 6L and 6R actually receive the trigger and then perform the image capture operation depending on a clock generator included in each of the stereo cameras 6L and 6R, a trigger distribution device for distributing the trigger in the information processing apparatus 50, and a difference in a trigger wire length in the information processing apparatus 50 and each of the stereo cameras 6L and 6R. It is preferable that the deviation of the timing of the image capture operation be reduced as much as possible.

In particular, it is preferable to reduce the deviation of the timing of the image capture operation performed by the stereo cameras 6L and 6R having the known baseline length to be as little as possible. For example, when designing a route of the trigger supply wire from the camera I/F 5010a to each of the stereo cameras 6L and 6R, there may be a case that a relay for securing the quality of trigger and a photocoupler for protecting the signal from electrostatic noise are included. In this case, it is preferable that the stereo cameras 6L and 6R to share the relay and photocoupler.

Figure 22:
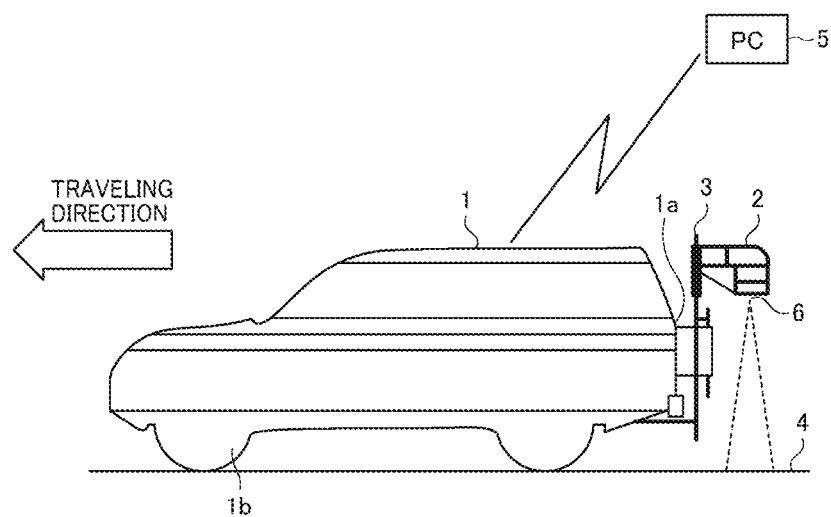
FIG. 22 illustrates example of another configuration of an image processing system according to the first embodiment.

Although the image processing system 10 according to the first embodiment employs the PC 5 as the information processing apparatus 50 disposed in the vehicle 1 used as the movable apparatus, the configuration is not limited thereto. FIG. 22 illustrates an example of another configuration of the image processing system 10 according to the first embodiment. As illustrated in FIG. 22, the image processing system 10 can be configured with the vehicle 1 used as the movable apparatus, and the PC 5 used as the information processing apparatus 50 that is provided outside the vehicle 1, such as a remote site. Further, the image data can be transmitted from the vehicle 1 to the PC 5 via a cloud server. By saving the image data on the cloud server, multiple PCs can refer to and download the same image data, and the stitching of image data can be performed by the multiple PCs. As a result, when inspecting road properties, inspection-related works can be performed at multiple sites, and thereby improving the efficiency of inspection. Regarding the connection with the PC, if the image capture apparatus and the PC 5 can communicate with each other, or if the image capture apparatus and the vehicle 1 can communicate with each other, the vehicle 1 that has acquired the captured images can be configured to communicate with the PC 5 using, for example, wireless communication. Further, in this case, by using, for example, the latest wireless standards, such as the next generation mobile communication standard "5G" which is capable of providing data at higher speed, lower delay and higher efficiency, the communication with the cloud server can be performed efficiently. Further, conventional wireless communication standards can be also used.

Further, as to the image processing system 10, for example, a first entity operator captures a plurality of images including the distance information in the depth direction of the road (traveling surface), and provides the captured images to a second entity operator, and then the second entity operator performs the above-described image processing and outputs an inspection report and submits the inspection report to the administrative organization.

Further, the first entity operator captures a plurality of images including the distance information in the depth direction of the road (traveling surface) and provides the captured images to the second entity operator, and then the second entity operator performs the above-described image processing and provides the processed images to a third entity operator, and then the third entity operator outputs the inspection report and submits an inspection report to the administrative organization.

Second Embodiment

Hereinafter, a description is given of a second embodiment.

In the description of the second embodiment, descriptions of the same parts as those of the first embodiment will be omitted, and the points different from the first embodiment will be described.

In the first embodiment described above, the trigger for instructing the stereo cameras 6L and 6R to perform the image capture operation is generated outside the stereo cameras 6L and 6R, for example, by the information processing apparatus 50, and then the generated trigger is supplied to the stereo cameras 6L and 6R, but not limited thereto. In the second embodiment, the trigger is generated in any one of the stereo cameras 6L and 6R, and then the generated trigger is used to instruct the stereo cameras 6L and 6R to perform the image capture operation.

Figure 23:
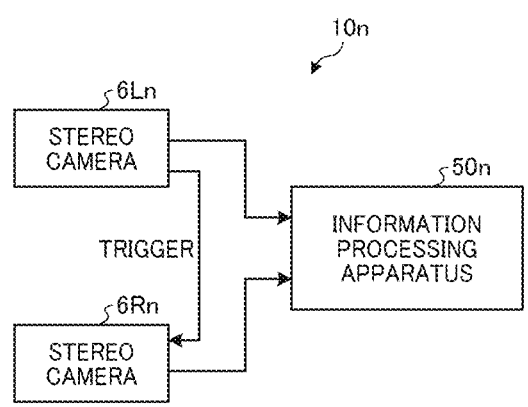
FIG. 23 illustrates an example of a hardware block diagram of an image processing system according to a second embodiment.

FIG. 23 illustrates an example of a hardware block diagram of an image processing system 10n according to the second embodiment. As illustrated in FIG. 23, the image processing system 10n includes, for example, stereo cameras 6Ln and 6Rn, and an information processing apparatus 50n, which correspond to the stereo cameras 6L and 6R and the information processing apparatus 50 in FIG. 11, respectively. Any one of the stereo cameras 6Ln and 6Rn (e.g., stereo camera 6Ln in FIG. 23) can be configured to generate the trigger and instructs the stereo cameras 6Ln to perform the image capture operation using the generated trigger. Further, the stereo camera 6Ln supplies the generated trigger to the stereo camera 6Rn to instruct the stereo camera 6Rn to perform the image capture operation.

Figure 24:
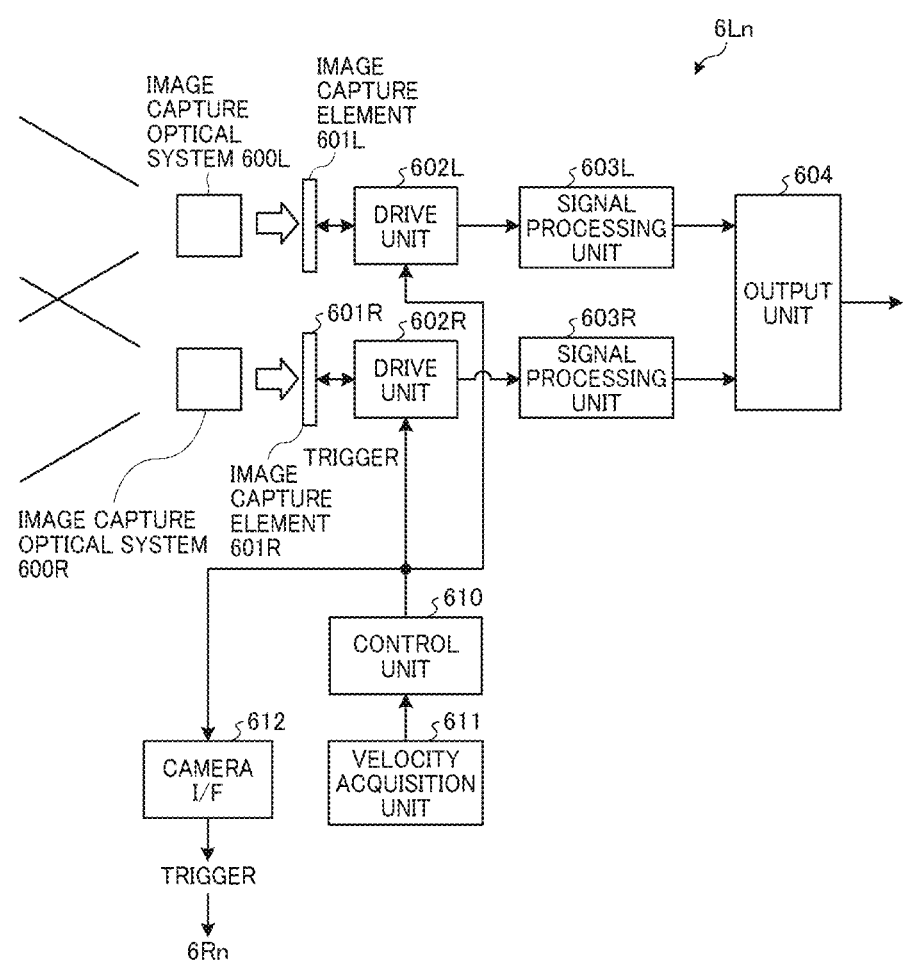
FIG. 24 illustrates an example of a functional block diagram of a stereo camera according to the second embodiment.

FIG. 24 illustrates an example of a functional block diagram of the stereo camera 6Ln according to the second embodiment. In FIG. 24, the parts which are common to those of FIG. 12 above described are assigned with the same reference numerals and the detailed description thereof will be omitted.

Similar to the stereo camera 6L described with reference to FIG. 12, as illustrated in FIG. 24, the stereo camera 6Ln includes, for example, the image capture optical systems 600L and 600R, the image capture elements 601L and 601R, the drive units 602L and 602R, the signal processing units 603L and 603R, and the output unit 604. The stereo camera 6Ln further includes, for example, a control unit 610, a velocity acquisition unit 611, and a camera I/F 612.

The velocity acquisition unit 611, corresponding to the velocity acquisition unit 5021 described with reference to FIG. 13, acquires velocity information indicating the velocity of the stereo camera 6Ln. The velocity acquisition unit 611 has, for example, a function of receiving a signal of GNSS and acquires the velocity information indicating the velocity of the stereo camera 6Ln based on the Doppler effect of the received GNSS signal, but not limited thereto. Alternatively or additionally, the velocity acquisition unit 611 can acquire the velocity information indicating the velocity of the vehicle 1 from a system disposed in the vehicle 1.

The control unit 610 generates the trigger to be used for instructing the stereo camera 6Ln and the stereo camera 6Rn to perform the image capture operation based on the velocity information acquired by the velocity acquisition unit 611 and the image capture range of the stereo camera 6Ln. As a method of generating the trigger, the first generation method or the second generation method described above can be applied. Further, it is assumed that the control unit 610 stores information related to the image capture range of the stereo camera 6Ln in advance.

The camera I/F 612 of the stereo camera 6Ln can be used as an interface to the stereo camera 6Rn. The control unit 610 of the stereo camera 6Ln supplies the generated trigger to the drive units 602L and 602R, and also supplies the generated trigger to the stereo camera 6Rn via the camera I/F 612.

The stereo camera 6Rn employs a configuration equivalent to that of the stereo camera 6Ln. In the stereo camera 6Rn, the trigger supplied from the stereo camera 6Ln is supplied to the camera I/F 612 included the stereo camera 6Rn, and then supplied from the camera I/F 612 to the drive units 602L and 602R included in the stereo camera 6Rn. Further, the stereo camera 6Rn, which is supplied with the trigger, can omit the control unit 610 and the velocity acquisition unit 611.

Figure 25:
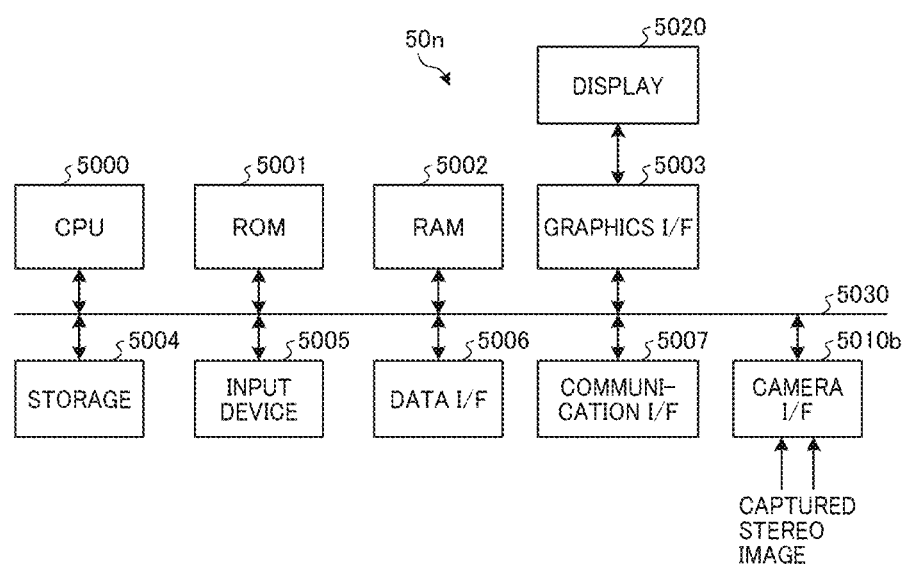
FIG. 25 illustrates an example of a hardware block diagram of an information processing apparatus according to the second embodiment.

FIG. 25 illustrates an example of a hardware block diagram of the information processing apparatus 50n according to the second embodiment. In FIG. 25, the parts which are common to those of FIG. 13 above described are assigned with the same reference numerals and a detailed description thereof will be omitted. As illustrated in FIG. 25, the information processing apparatus 50n employs a configuration, omitting the velocity acquisition unit 5021 included in the information processing apparatus 50 illustrated in FIG. 13. Further, the camera I/F 5010b receives or acquires the stereo image from each of the stereo cameras 6Ln and 6Rn, but does not output the trigger. Further, the functions of the information processing apparatus 50n does not include the image capture control unit 503 illustrated in the functional block diagram illustrated in FIG. 14.

Similar to the image processing system 10 according to the above described first embodiment, in the image processing system 10n according to the second embodiment, the stereo image can be captured by each of the stereo camera 6Ln and the stereo camera 6Rn by maintaining the traveling direction overlapping ratio "Dr" in the traveling direction of the vehicle 1.

If the stereo camera 6Ln and the stereo camera 6Rn employ the configuration illustrated in FIG. 24, each of the stereo camera 6Ln and the stereo camera 6Rn can perform the image capture operation based on the trigger generated at each of the stereo camera 6Ln and the stereo camera 6Rn, respectively. In this case, for example, a clock is shared by the stereo camera 6Ln and the stereo camera 6Rn to synchronize the image capturing timing at the stereo camera 6Ln and the stereo camera 6Rn.

The embodiments of the present invention are not limited to the preferred embodiments of the present invention but can be performed by various modifications within a scope that does not depart from the present invention. Any one of the above-described operations may be performed in various other ways, for example, in an order different from the one described above.

Although the above described embodiments describes roads and highways as the traveling surface where the movable apparatus travels, the above described embodiments can be also applied to other surfaces, such as runways of airports. Further, the above described embodiments can be also applied to the measurement of a vertical-hole-shape, e.g. defined within a reinforced concrete structure, such as a hoist (elevator shaft enclosing an elevator) in which an elevator moves as the movable apparatus. Especially, deformation and/or cracking may occur on the wall of the hoistway due to the deterioration over time and/or shaking of the building due to earthquake or the like. By applying the above described embodiments, properties of the wall of the hoistway can be measured by installing the stereo camera outside the elevator. Since the inside of the hoistway is dark and the illuminance becomes insufficient for capturing images, one or more lighting devices, such as light emitting diode (LED) light source, are required to be disposed as needed. Further, materials of the target object, such as roads and the wall of the hoistway, are not limited, but can be any materials, such as asphalt and concrete.

The wall of the elevator shaft is a counter face or opposing surface that faces an outer face of the elevator, and in this description, the counter face can be also construed as the above described traveling surface. Further, the traveling surface and the counter face can be referred to as the inspection surface or the target surface to be inspected using the above described apparatus and system of the embodiments. Although the elevator does not run on the wall of the elevator shaft, the above described embodiments can be applied to an in-contact moveable apparatus (e.g., vehicle) that moves on roads while contacting with each other and a non-contact moveable apparatus (e.g., elevator) that moves without contacting a surface (e.g., wall of the elevator shaft). Therefore, the moveable apparatus is not limited to be an in-contact moveable apparatus, but can be a non-contact moveable apparatus, such as an aircraft, and drone. In a case of the non-contact moveable apparatus, it is important to maintain the relative position of the non-contact moveable apparatus with respect to the inspection surface (i.e., not to change the relative position). However, if the position of the non-contact moveable apparatus can be estimated correctly, the change of relative position of the non-contact moveable apparatus with respect to the inspection surface can be cancelled, that is compensated, in which case changing of the relative position of the non-contact moveable apparatus with respect to the inspection surface may not become a problem for the surface inspection. Similarly, the movable apparatus may be an apparatus which is adapted to carry a human passenger, or an apparatus which does not carry a passenger (such as a drone). In the latter case, the movable vehicle may be of a type controlled remotely (i.e. by a human operator or a computer system at a position spaced from the movable apparatus) and/or automatically (i.e. by a computer system rather than a human operator). For example, by applying the automatic control (that is, automatic driving), such as "continue to travel by passing along the position that is 1-meter right from the white line on the left side of the lane," human-causing operation errors of the vehicle can be reduced and thereby images of the traveling surface can be captured reliably.

In each of the above described embodiments, the stereo camera is employed as the image capture unit for capturing the stereo image, but the image capture unit is not limited to the stereo camera. For example, a monocular lens camera can be used as the image capture unit. In this case, images are captured for a plurality of times in the width direction of the traveling surface while stopping the vehicle. Further, a color filter can be attached to a lens of the monocular lens camera. The color filter generates a color shift corresponding to a distance to an object, and the distance can be measured for each pixel by analyzing the color shift. Thus, the image capture unit in this specification is not limited to the stereo camera as long as the image capture unit can obtain images including "distance information in the depth direction."

Further, the image processing system can be an output system including an output unit for outputting the stitched images, instead of the image processing unit for performing the stitching process. For example, the output system can include an acquisition unit that acquires a plurality of images including the distance information in the depth direction, captured for the traveling surface where the movable apparatus travels, and an output unit that outputs one image, synthesized by stitching the plurality of acquired captured images. Further, instead of the matching process, the positions of the plurality of captured images can be correlated using a learning model, which is generated by learning a large number of captured images.

Hereinafter, a description is given of a method of processing information in the image processing unit (image processing means) 111. The image processing unit 111 performs the stereo matching to the captured images, which are acquired by the captured image acquisition unit 500, for each of the stereo cameras that have captured the images to arrange the depth distances corresponding to the respective pixels as an image to generate a depth map. This method is described in more detail with reference to the following flowchart.

Figure 26:
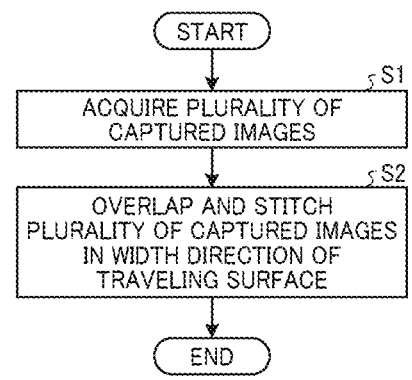
FIG. 26 is an example of a flowchart illustrating the steps of information processing in an image processing unit according to the first and second embodiments.

FIG. 26 is an example of a flowchart illustrating the steps of information processing in the image processing unit 111. As illustrated in FIG. 26, the image processing unit 111 acquires a plurality of images including the distance information in the depth direction obtained by capturing images of the traveling surface of the vehicle 1 using the stereo camera 6 (step S1). Then, the image processing unit 111 overlaps the plurality of acquired captured images and stitches the plurality of acquired captured images in the width direction of the traveling surface (step S2).

Figure 27:
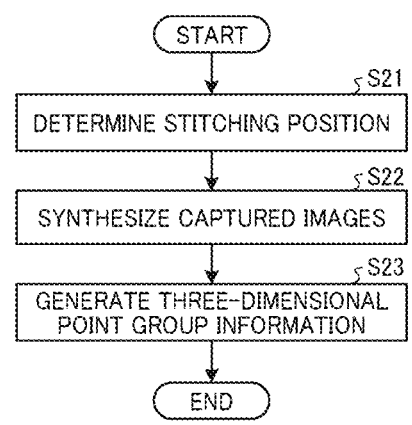
FIG. 27 is an example of a flowchart illustrating the steps of stitching process performed in step S2.

The stitching process performed in step S2 is further described. FIG. 27 is an example of a flowchart illustrating the steps of stitching process performed in step S2. As illustrated in FIG. 27, the image processing unit 111 determines a position for stitching the plurality of captured images where the relative positions are correlated (step S21), synthesizes the plurality of captured images into one image by stitching the plurality of captured images at the determined stitching position (step S22), and generates three-dimensional point group information from the one image synthesized from the plurality of captured images (step S23).

The above described embodiments can be configured as below.

(Configuration 1)

An image capture apparatus, which captures an image of a shape of a measurement target, includes an image capture control unit that captures a stereo image of the measurement target in accordance with an image capture trigger, and outputs the stereo image including a given image capture range, an acquisition unit that acquires velocity information indicating velocity of the image capture apparatus relative to the measurement target, and a generation unit that generates the image capture trigger with a time interval that is set shorter than a time period in which the image capture apparatus moves for a given distance along a traveling direction with the velocity indicated by the velocity information in view of the image capture range used for capturing the image of the measurement target.

(Configuration 2)

As to the image capture apparatus of configuration 1, based on the velocity information and the given distance, the generation unit generates the image capture trigger with the time interval that can set an overlapping ratio of two stereo images, captured as stereo images next to each other, is equal to or greater than a threshold value, in which one stereo image is output from the image capture control unit in response to one image capture trigger and another stereo image is output from the image capture control unit in response to another image capture trigger, which is output right after the one image capture trigger.

(Configuration 3)

As to the image capture apparatus of configurations 1 or 2, the acquisition unit acquires the velocity information indicating the velocity that is determined in advance as the fastest velocity of the image capture apparatus with respect to the measurement target.

(Configuration 4)

As to the image capture apparatus of configuration 3, if the overlapping ratio of the two stereo images (i.e., one stereo image output from the image capture control unit in response to one image capture trigger and another stereo image output from the image capture control unit in response to another image capture trigger, which is output right after the one image capture trigger) becomes smaller than a threshold value, the image capture control unit discards another stereo image.

(Configuration 5)

As to the image capture apparatus of configurations 1 or 2, the acquisition unit acquires the velocity information indicating the velocity of the image capture apparatus while traveling or moving with respect to the measurement target.

(Configuration 6)

As to the image capture apparatus of any one of configurations 1 to 5, the generation unit supplies the generated image capture trigger to the image capture control unit of one image capture apparatus and the image capture control unit of another image capture apparatus to partially overlap the image capture range of the one image capture apparatus and the image capture range of another image capture apparatus used for capturing an image of the measurement target, in a direction different from the velocity direction.

(Configuration 7)

As to the image capture apparatus of any one of configurations 1 to 5, the image capture apparatus includes a plurality of image capture control units, each performs stereo imaging of the measurement target and outputs a stereo image included in an image capture range used for capturing the stereo image, and the generation unit supplies the image capture trigger to each of the plurality of image capture control units.

(Configuration 8)

As to the image capture apparatus of configuration 7, each of the plurality of image capture control units is disposed next to each other in a direction different from the velocity direction while partially overlapping the image capture ranges respectively set for each of the image capture control units.

(Configuration 9)

A method of capturing an image of a shape of a measurement target using an image capture apparatus includes a step of capturing a stereo image of the measurement target in accordance with an image capture trigger and outputting the stereo image including a given image capture range, a step of acquiring velocity information indicating a velocity of the image capture apparatus relative to the measurement target, and a step of generating the image capture trigger with a time interval that is set shorter than a time period in which the image capture apparatus moves for a given distance along a traveling direction with the velocity indicated by the velocity information in view of the image capture range used for capturing the image of the measurement target.

(Configuration 10)

A movable apparatus includes the image capture apparatus according to any of configurations 1 to 8, a fixing unit fixable to a housing of the movable apparatus to hold the image capture apparatus used for capturing an image of a traveling surface where the movable apparatus travels, and a movement drive unit configured to move the housing.

(Configuration 11)

An information processing apparatus, which is configured to evaluate properties of a road surface (i.e., measurement target) based on the stereo image output from the image capture apparatus of any one of configurations 1 to 8, includes a captured image acquisition unit that acquires the stereo image output from the image capture apparatus of any one of configurations 1 to 8, and a calculation unit that calculates the maintenance control index (MCI) for paved surface for evaluating the properties of road surface based on the stereo image acquired by the captured image acquisition unit.

(Configuration 12)

As to the information processing apparatus of configuration 11, the calculation unit generates three dimensional (3D) information based on the captured stereo image, calculates a depth distance in the width direction of the road based on the generated 3D information, and calculates the rutting depth, to be used for calculating the maintenance control index (MCI) for the paved surface, based on the calculated depth distance.

(Configuration 13)

As to the information processing apparatus of configuration 11, the calculation unit generates three dimensional (3D) information based on the captured stereo image, calculates a depth distance of the road surface based on the generated 3D information along a given part of the road surface, and calculates the flatness to be used for calculating the maintenance control index (MCI) for the paved surface based on the calculated depth distance.

(Configuration 14)

As to the information processing apparatus of configuration 11, the calculation unit performs the image analysis on the stereo image, and calculates the crack ratio on the road surface based on a result of the image analysis.

(Configuration 15)

As to the information processing apparatus of configuration 11, the calculation unit generates three dimensional (3D) information based on the captured stereo image, calculates a depth distance in the width direction of the road based on the generated 3D information, and calculates the rutting depth based on the calculated depth distance, and further, the calculation unit calculates the depth distance of the road surface based on the generated 3D information along a given part of the road surface and calculates the flatness based on the calculated depth distance, and further, the calculation unit performs the image analysis on the stereo image, and calculates the crack ratio on the road surface based on a result of the image analysis, and further, the calculation unit calculates the maintenance control index (MCI) for the paved surface based on the calculated rutting depth, flatness, and crack ratio.

(Configuration 16)

A program for causing an information processing apparatus to perform a process for evaluating properties of a road surface (i.e., measurement target) based on the stereo image output from the image capture apparatus of any one of configurations 1 to 8 includes a method of acquiring the stereo image output from the image capture apparatus of any one of configurations 1 to 8, and calculating the maintenance control index (MCI) for a paved surface for evaluating the properties of road surface based on the acquired stereo image.

The present disclosure can be implemented in any convenient form, for example using dedicated hardware, or a mixture of dedicated hardware and software. The present disclosure may be implemented as computer software implemented by one or more networked processing apparatuses. The processing apparatuses can compromise any suitably programmed apparatuses such as a general purpose computer, personal digital assistant, mobile telephone (such as a WAP or 3G-compliant phone) and so on. Since the present disclosure can be implemented as software, each and every aspect of the present disclosure thus encompasses computer software implementable on a programmable device. The computer software can be provided to the programmable device using any conventional carrier medium (carrier means). The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

This patent application is based on and claims priority pursuant to 35 U.S.C. § 119(a) to Japanese Patent Application Nos. 2018-051843, filed on Mar. 19, 2018, and 2019-047938, filed on Mar. 15, 2019 in the Japan Patent Office, the entire disclosure of which is hereby incorporated by reference herein.

REFERENCE SIGNS LIST 1 vehicle
1a housing
1b movement drive unit
2 fixing unit
4 road surface
5 PC
6, 6L, 6R stereo camera
6LL, 6LR, 6RL, 6RR imaging lens
10, 10n image processing system
10A image capture apparatus
50, 50n information processing apparatus
60C,60L, 60R stereo image capture range
60CL, 60CR, 60LL, 60LR, 60RL, 60RR image capture range
100-1, 100-2 image capture unit
101-1, 101-2 image capture control unit
102, 611, 5021 velocity acquisition unit
103 generation unit
500 captured image acquisition unit
503 image capture control unit
510 matching processing unit
511 3D information generation unit
520 3D information acquisition unit
521 property feature value calculation unit
522 report creation unit
600L,600R image capture optical system
601L,601R image capture element
602L,602R drive unit

The invention claimed is:

1. An information processing apparatus, comprising:
circuitry configured to
measure a rutting depth on a traveling surface where a movable apparatus travels based on distance information in a depth direction of the traveling surface obtained by an image capture device; and
exclude a side end of the traveling surface when measuring the rutting depth.

2. The information processing apparatus according to claim 1, wherein the image capture device is a stereo image capture device.

3. The information processing apparatus according to claim 1, wherein the image capture device is a plurality of stereo image capture devices, and the circuitry is configured to stitch together a plurality of images captured by the plurality of stereo image capture devices in a width direction of the traveling surface.

4. The information processing apparatus according to claim 3, wherein the circuitry is further configured to control the plurality of stereo image capture devices synchronously.

5. The information processing apparatus according to claim 3, wherein the circuitry is further configured to stitch together the plurality of images of the traveling surface captured by the plurality of stereo image capture devices by correlating distance information of each pixel in the overlapping portion of pairs of the images.

6. The information processing apparatus according to claim 3, wherein the circuitry is further configured to create a depth map including data representing each pixel in each one of the plurality of captured images of the traveling surface based on distance information.

7. The information processing apparatus according to claim 3, wherein the circuitry is further configured to correlate luminance of each pixel in an overlapping portion of the images that are captured by the respective stereo image capture devices.

8. The information processing apparatus according to claim 1, wherein the circuitry is further configured to exclude any foreign matter on the traveling surface when measuring the rutting depth.

9. The information processing apparatus according to claim 3, wherein each of the stereo image capture devices includes an image capture element configured to employ a simultaneous exposure and collective readout system, whereby each image is composed of pixels which were captured at the same time.

10. A movable apparatus, comprising:
the information processing apparatus of claim 1;
a fixing structure fixable to a housing of the movable apparatus to hold the image capture device used for capturing an image of the traveling surface; and
a movement driver including a motor configured to move the housing.

11. The movable apparatus according to claim 10, wherein the image capture device is a stereo image capture device.

12. The movable apparatus according to claim 10, wherein the image capture device is a plurality of stereo image capture devices, and the circuitry is configured to stitch together a plurality of images captured by the plurality of stereo image capture devices in a width direction of the traveling surface.

13. The movable apparatus according to claim 12, wherein the circuitry is further configured to control the plurality of stereo image capture devices synchronously.

14. An image processing system, comprising:
an image capture device configured to capture an image of a traveling surface where a movable apparatus travels; and
an information processing apparatus including
circuitry configured to
measure a rutting depth on the traveling surface where the movable apparatus travels based on distance information in a depth direction of the traveling surface obtained by the image capture device; and
exclude a side end of the traveling surface when measuring the rutting depth.

15. The image processing system according to claim 14, wherein the image capture device is a stereo image capture device.

16. The image processing system according to claim 14, wherein the image capture device is a plurality of stereo image capture devices, and the circuitry is configured to stitch together a plurality of images captured by the plurality of stereo image capture devices in a width direction of the traveling surface.

17. The image processing system of claim 14, further comprising the movable apparatus, wherein the movable apparatus includes
  a housing;
  a fixing structure fixable to the housing of the movable apparatus to hold the image capture device used for capturing the image of the traveling surface where the movable apparatus travels; and
  a movement driver including a motor configured to move the housing.

18. A method of processing information comprising:
  measuring a rutting depth on a traveling surface where a movable apparatus travels based on distance information in a depth direction of the traveling surface obtained by an image capture device; and
  excluding a side end of the traveling surface when measuring the rutting depth.

19. The method of claim 18, wherein the image capture device is a stereo image capture device.

20. The method of claim 18, wherein the image capture device is a plurality of stereo image capture devices, and the method includes stitching together a plurality of images captured by the plurality of stereo image capture devices in a width direction of the traveling surface.

* * * * *